(12) United States Patent
Kamakura et al.

(10) Patent No.: US 11,835,713 B2
(45) Date of Patent: Dec. 5, 2023

(54) OPTICAL SCANNING APPARATUS, THREE-DIMENSIONAL MEASUREMENT APPARATUS, AND ROBOT SYSTEM

(71) Applicant: SEIKO EPSON CORPORATION, Tokyo (JP)

(72) Inventors: Kei Kamakura, Suwa-Gun Hara-Mura (JP); Hirokazu Yamaga, Chino (JP); Takeshi Shimizu, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 579 days.

(21) Appl. No.: 17/111,518

(22) Filed: Dec. 4, 2020

(65) Prior Publication Data
US 2021/0173200 A1 Jun. 10, 2021

(30) Foreign Application Priority Data
Dec. 6, 2019 (JP) ................. 2019-221054

(51) Int. Cl.
*G06F 17/00* (2019.01)
*G02B 26/10* (2006.01)
*G05D 1/02* (2020.01)
*G02B 26/08* (2006.01)

(52) U.S. Cl.
CPC ....... *G02B 26/105* (2013.01); *G02B 26/0833* (2013.01); *G05D 1/0251* (2013.01)

(58) Field of Classification Search
CPC ............ G02B 26/105; G02B 26/0833; G02B 26/085; G05D 1/0251; B25J 19/021; B25J 9/1679; B25J 9/1602; B25J 9/1661; B25J 9/1697; B25J 13/087; B25J 18/00
USPC ........................................... 700/258
See application file for complete search history.

(56) References Cited

U.S. PATENT DOCUMENTS

| | | | |
|---|---|---|---|
| 10,571,552 B1 * | 2/2020 | Gao | G01S 7/484 |
| 10,753,738 B2 * | 8/2020 | Wakabayashi | B25J 13/087 |
| 11,040,453 B2 * | 6/2021 | Hino | B25J 9/0087 |
| 11,223,756 B1 * | 1/2022 | Sharma | H04N 23/55 |
| 11,422,361 B2 * | 8/2022 | Kojima | G01B 11/2518 |
| 11,548,160 B2 * | 1/2023 | Shimizu | B25J 19/022 |
| 11,693,097 B2 * | 7/2023 | Yamaga | G01S 17/89 700/259 |

(Continued)

FOREIGN PATENT DOCUMENTS

| | | |
|---|---|---|
| JP | 2009204904 A | 9/2009 |
| JP | 2014089062 A | 5/2014 |

OTHER PUBLICATIONS

A_decade_of_MEMS_and_its_future (Year: 2023).*

(Continued)

*Primary Examiner* — Ronnie M Mancho
(74) *Attorney, Agent, or Firm* — Gang Yu

(57) ABSTRACT

An optical scanning apparatus includes a MEMS substrate, a substrate fixing section to which the MEMS substrate is fixed, and an environment detection sensor that detects an environment factor associated with the mirror. The environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

8 Claims, 16 Drawing Sheets

(56) References Cited

U.S. PATENT DOCUMENTS

| | | | | |
|---|---|---|---|---|
| 2012/0236379 A1* | 9/2012 | da Silva | ............ | G02B 26/0841 |
| | | | | 359/200.8 |
| 2019/0091870 A1* | 3/2019 | Hino | ........................ | B25J 5/007 |
| 2019/0094017 A1* | 3/2019 | Wakabayashi | ......... | B25J 9/1697 |
| 2019/0285886 A1* | 9/2019 | Yamashiro | ............ | H04N 1/053 |
| 2019/0389068 A1* | 12/2019 | Shimizu | ............... | G01B 11/254 |
| 2020/0025923 A1* | 1/2020 | Eichenholz | ............. | G01S 17/10 |
| 2020/0228771 A1* | 7/2020 | Novotny | .............. | H04N 9/3135 |
| 2020/0310107 A1* | 10/2020 | Kojima | ................ | G02B 26/085 |

OTHER PUBLICATIONS

A Progress Review on Solid-State LiDAR and Nanophotonics-Based LiDAR Sensors (Year: 2022).*

Search Report of the First Office Action CN Application No. 202011404402X dated Apr. 22, 2023.

* cited by examiner

OPTICAL SCANNING APPARATUS, THREE-DIMENSIONAL MEASUREMENT APPARATUS, AND ROBOT SYSTEM

The present application is based on, and claims priority from JP Application Serial Number 2019-221054, filed Dec. 6, 2019, the disclosure of which is hereby incorporated by reference herein in its entirety.

BACKGROUND

1. Technical Field

The present disclosure relates to an optical scanning apparatus, a three-dimensional measurement apparatus, and a robot system.

2. Related Art

As a three-dimensional measurement apparatus used in a robot system or any other apparatus, there is a known apparatus that irradiates a target object with patterned light to measure the three-dimensional shape of the target object, for example, by using a phase shift method or a space coding method. JP-A-2014-89062 discloses a three-dimensional measurement apparatus including an optical scanning apparatus using a mirror produced by MEMS (Micro Electro Mechanical Systems). The mirror is generally formed by cutting off part of a MEMS substrate. JP-A-2014-89062 describes that a change in temperature or any other environmental factor changes the angle of swing motion of the mirror.

To stabilize the swing motion of the mirror, it is desirable to detect the temperature or any other environmental factor. However, stress undesirable for the mirror and the MEMS substrate undesirably is induced depending, for example, on the position where a sensor is provided, resulting in a problem of unstable swing motion of the mirror.

SUMMARY

According to a first aspect of the present disclosure, an optical scanning apparatus is provided. The optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

According to a second aspect of the present disclosure, a three-dimensional measurement apparatus that three-dimensionally measures a target object by using laser light is provided. The three-dimensional measurement apparatus includes a projection section that includes a laser light source that outputs the laser light and an optical scanning apparatus that projects patterned light formed of the laser light on a region containing the target object, an imaging section that captures an image of the region containing the target object irradiated with the laser light to acquire image data, and a measurement section that three-dimensionally measures the region containing the target object based on the image data. The optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

According to a third aspect of the present disclosure, a robot system is provided. A robot system includes a robot including a robot arm, a three-dimensional measurement apparatus that is installed on the robot arm and three-dimensionally measures a target object by using laser light, and a robot control apparatus that controls operation of driving the robot based on a result of the measurement performed by the three-dimensional measurement apparatus. The three-dimensional measurement apparatus includes a projection section that includes a laser light source that outputs the laser light and an optical scanning apparatus that projects patterned light formed of the laser light on a region containing the target object, an imaging section that captures an image of the region containing the target object irradiated with the laser light to acquire image data, and a measurement section that three-dimensionally measures the region containing the target object based on the image data. The optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

DESCRIPTION OF EXEMPLARY EMBODIMENTS

An optical scanner, a three-dimensional measurement apparatus, and a robot system according to the present disclosure will be described below in detail based on an embodiment shown in the accompanying drawings. A configuration in which no environment detection sensor is provided will be described with reference to FIGS. 1 to 10, and a configuration in which an environment detection sensor is provided will be described with reference to FIG. 11 and the following figures.

Figure 1:
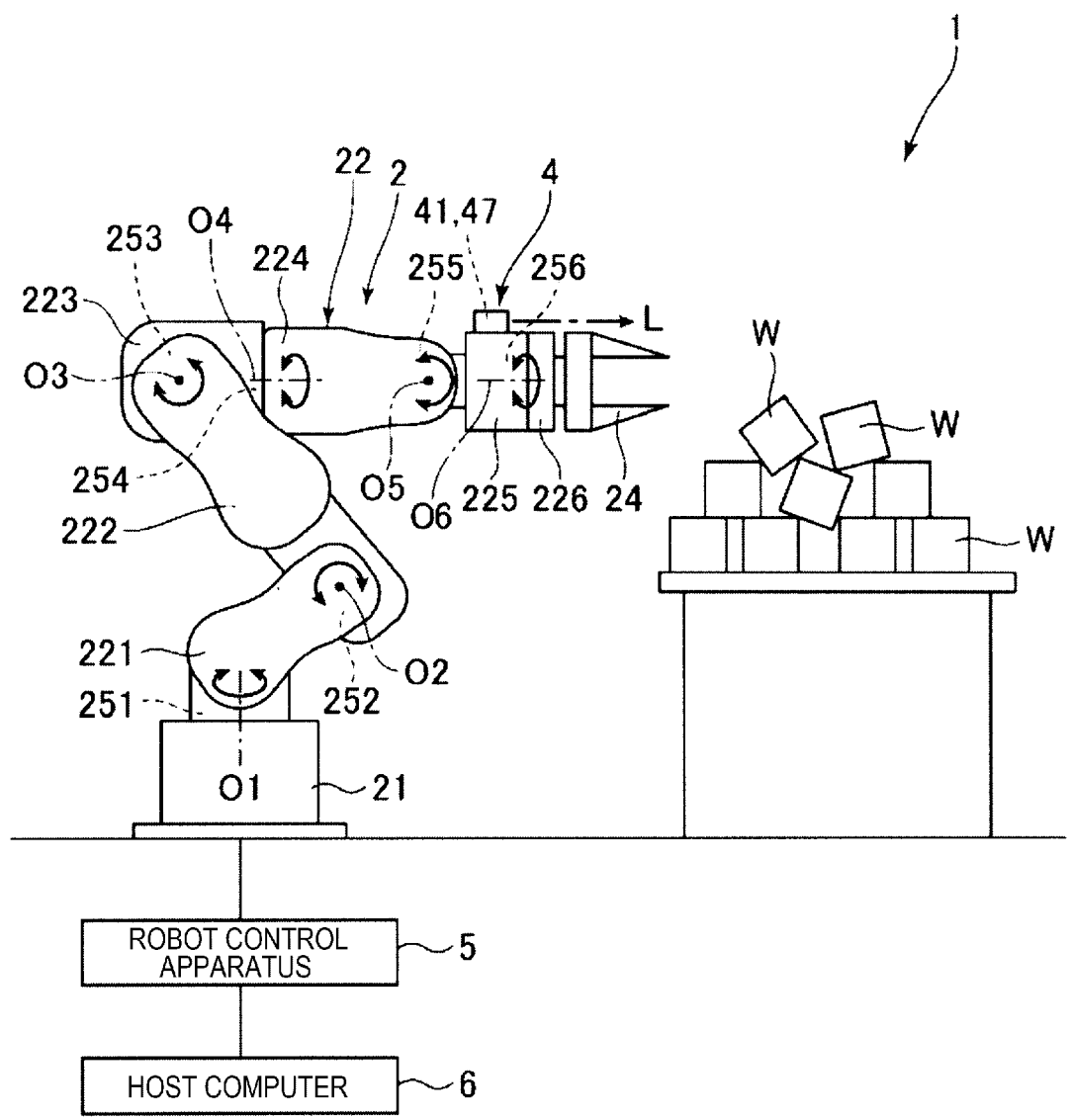
FIG. 1 shows an overall configuration of a robot system according to an embodiment.
Figure 2:
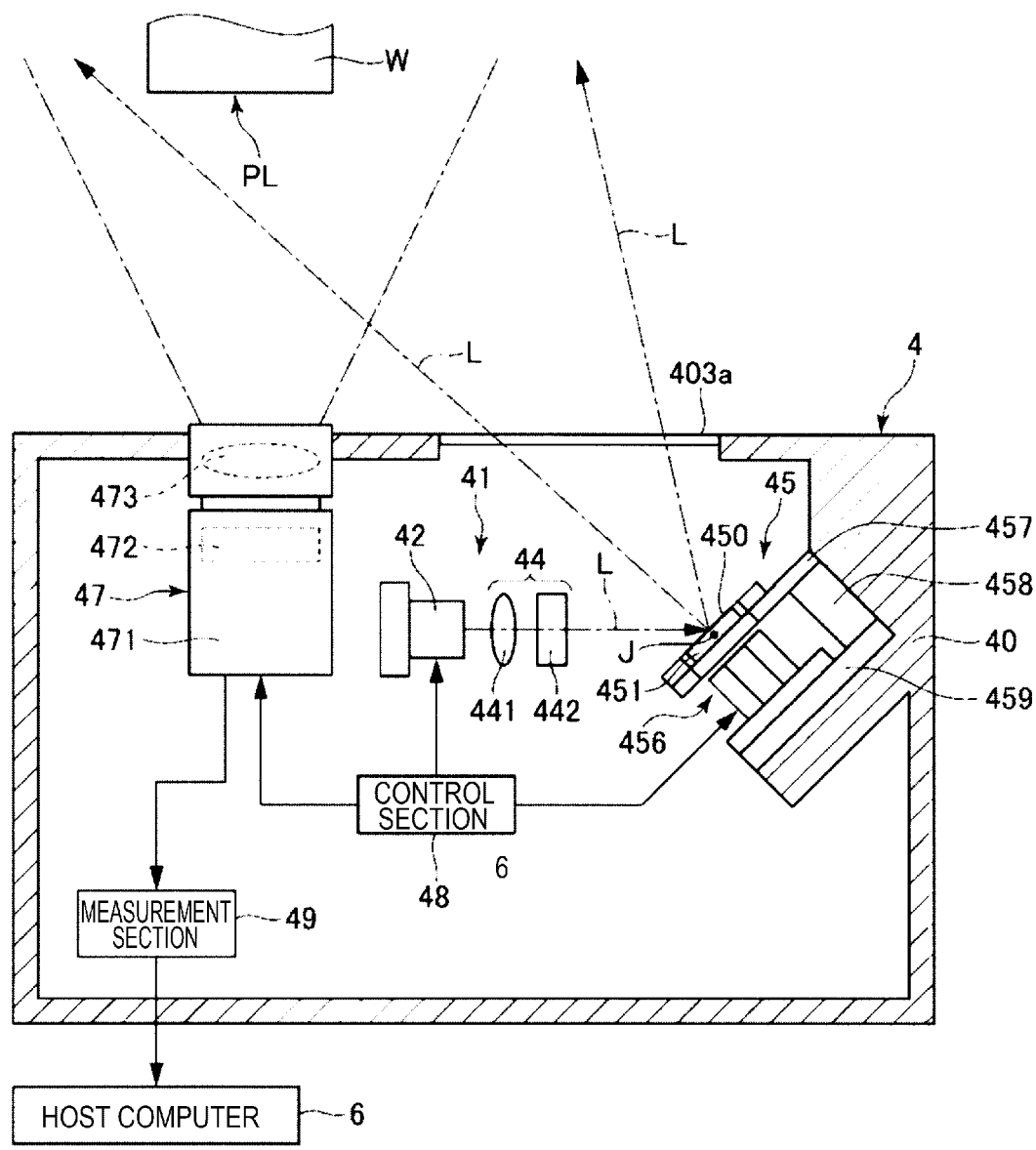
FIG. 2 shows an overall configuration of a three-dimensional measurement apparatus provided in the robot system shown in FIG. 1.
Figure 3:
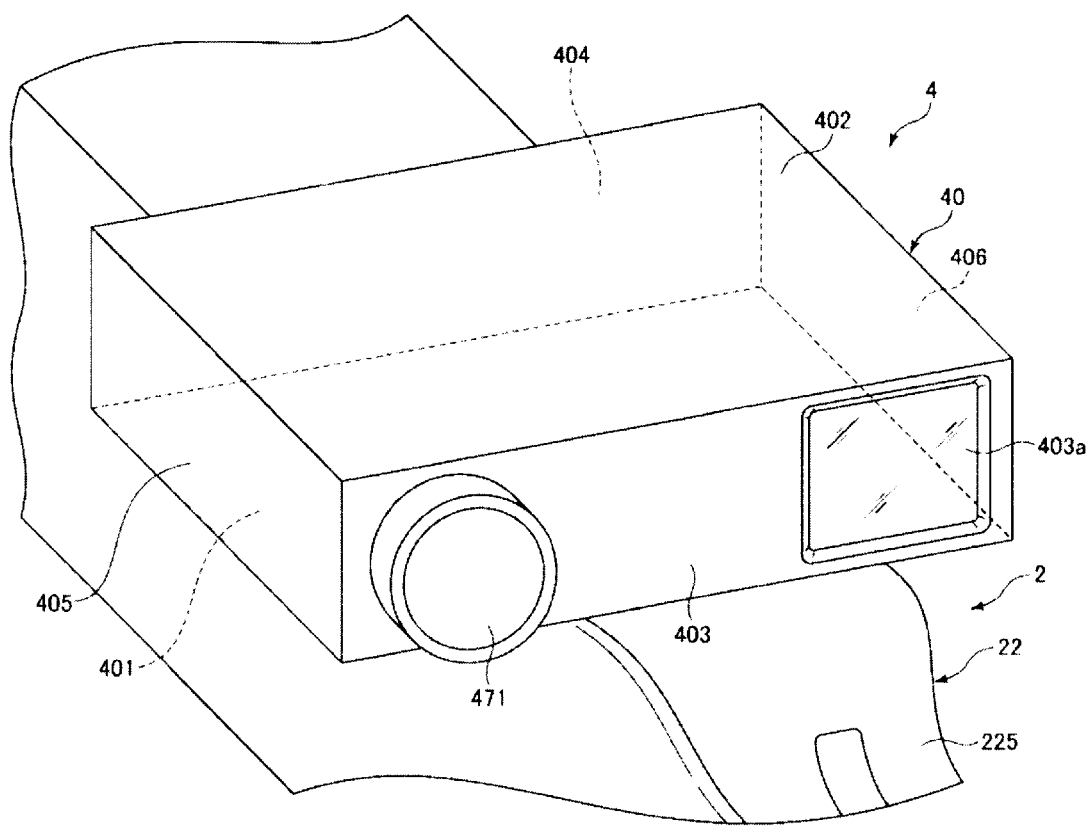
FIG. 3 is a perspective view showing the three-dimensional measurement apparatus shown in FIG. 2.
Figure 4:
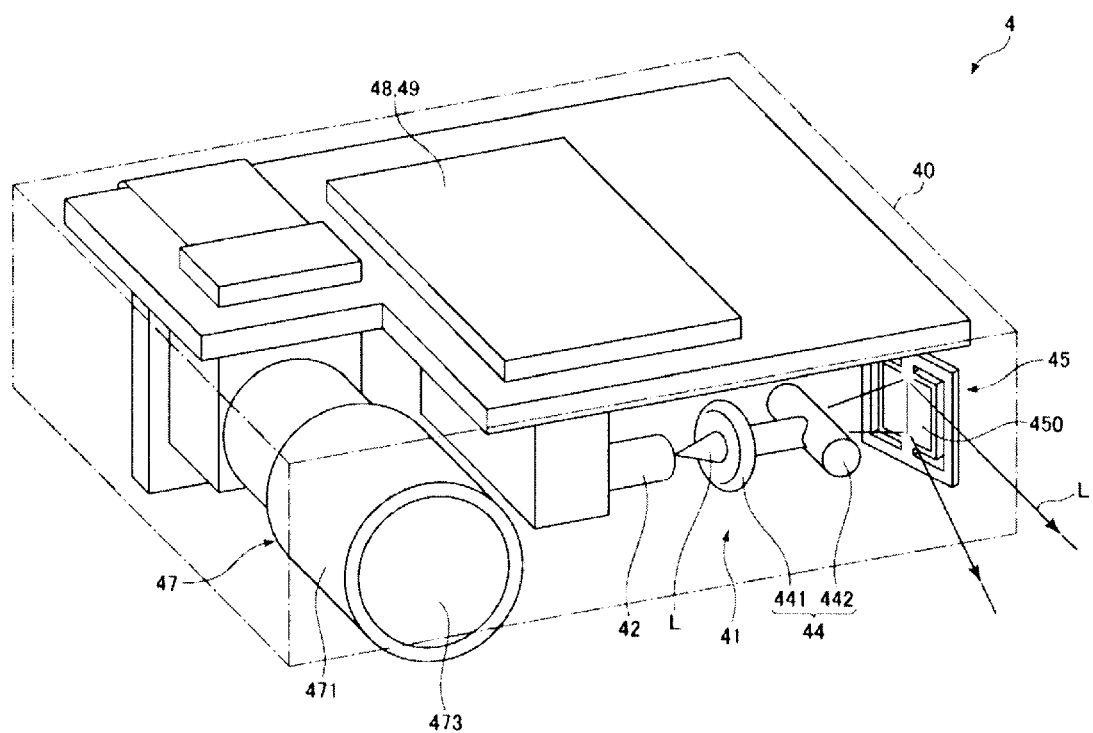
FIG. 4 is a perspective view showing the interior of the three-dimensional measurement apparatus shown in FIG. 3.
Figure 5:
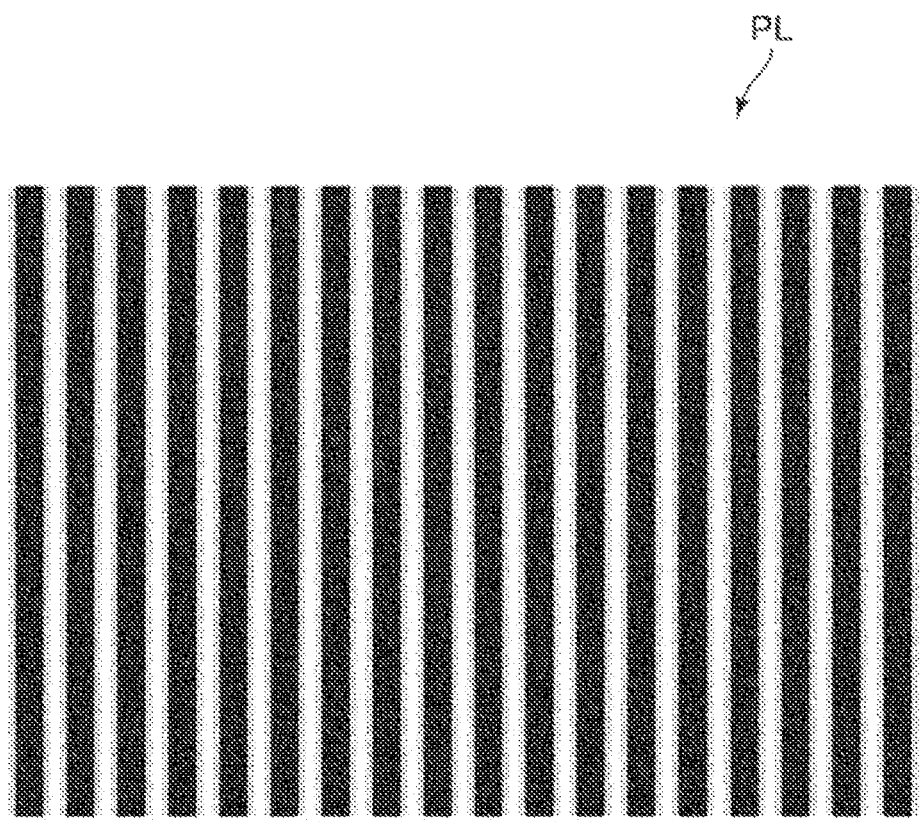
FIG. 5 is a plan view showing an example patterned light projected by a projection section shown in FIG. 4.
Figure 6:
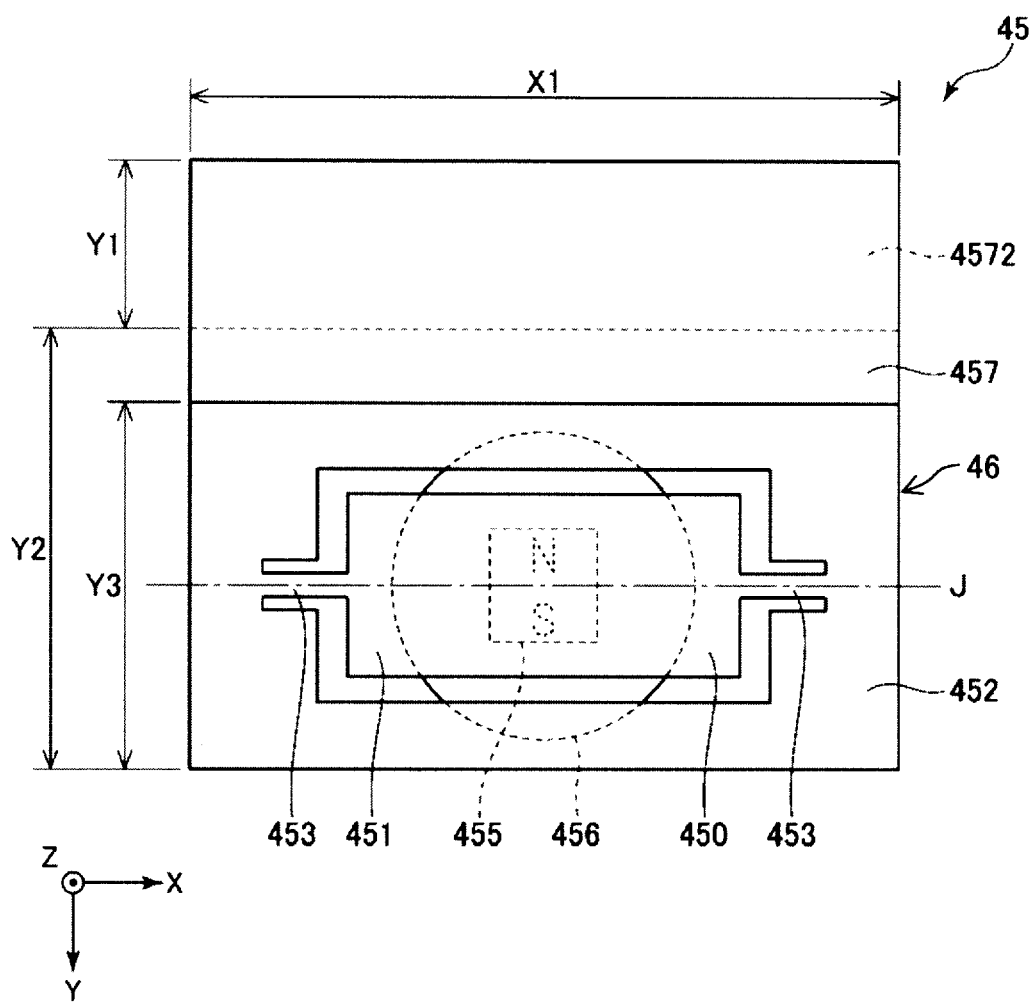
FIG. 6 is a plan view showing an optical scanning section provided in the three-dimensional measurement apparatus shown in FIG. 4.

FIG. 1 shows an overall configuration of a robot system according to the embodiment. FIG. 2 shows an overall configuration of a three-dimensional measurement apparatus provided in the robot system shown in FIG. 1. FIG. 3 is a perspective view showing the three-dimensional measurement apparatus shown in FIG. 2. FIG. 4 is a perspective view showing the interior of the three-dimensional measurement apparatus shown in FIG. 3. FIG. 5 is a plan view showing an example patterned light projected by a projection section shown in FIG. 4. FIG. 6 is a plan view showing an optical scanning section provided in the three-dimensional measurement apparatus shown in FIG. 4.

A robot system 1 shown in FIG. 1 includes a robot 2, a three-dimensional measurement apparatus 4, which three-dimensionally measures a target object W by using laser light L, a robot control apparatus 5, which controls operation of driving the robot 2 based on the result of the measurement performed by the three-dimensional measurement apparatus 4, and a host computer 6, which can communicate with the robot control apparatus 5. The portions described above can communicate with each other in a wired or wireless manner, and the communication may be performed over a network, such as the Internet.

1. Robot

The robot 2 is, for example, a robot that feeds, removes, transports, assembles, and otherwise handles a precise instrument and parts that form the precise instrument. The robot 2 is, however, not necessarily used in a specific application. The robot 2 according to the present embodiment is a six-axis robot and includes a base 21, which is fixed to a floor or a ceiling, and a robot arm 22, which is linked to the base 21, as shown in FIG. 1.

The robot arm 22 includes a first arm 221 so linked to the base 21 as to be pivotable around a first axis O1, a second arm 222 so linked to the first arm 221 as to be pivotable around a second axis O2, a third arm 223 so linked to the second arm 222 as to be pivotable around a third axis O2, a fourth arm 224 so linked to the third arm 223 as to be pivotable around a fourth axis O4, a fifth arm 225 so linked to the fourth arm 224 as to be pivotable around a fifth axis O5, and a sixth arm 226 so linked to the fifth arm 225 as to be pivotable around a sixth axis O6. An end effector 24 according to the work performed by the robot 2 is attached to the sixth arm 226. In the following description, a side of each of the first arm 221 to the sixth arm 226 that is the side facing the end effect 24 is also called a "distal end" or "distal end side," and a side of each of the first arm 221 to the sixth arm 226 that is the side facing the base 21 is also called a "proximal end" or "proximal end side."

The robot 2 further include a first driving apparatus 251, which causes the first arm 221 to pivot relative to the base 21, a second driving apparatus 252, which causes the second arm 222 to pivot relative to the first arm 221, a third driving apparatus 253, which causes the third arm 223 to pivot relative to the second arm 222, a fourth driving apparatus 254, which causes the fourth arm 224 to pivot relative to the third arm 223, a fifth driving apparatus 255, which causes the fifth arm 225 to pivot relative to the fourth arm 224, and a sixth driving apparatus 256, which causes the sixth arm 226 to pivot relative to the fifth arm 225. The first driving apparatus 251 to the sixth driving apparatus 256 each include, for example, a motor as a drive source, a controller that controls the operation of driving the motor, and an encoder that detects the amount of rotation produced by the motor. The first driving object 251 to the sixth driving apparatus 256 are independently controlled by the robot control apparatus 5.

The robot 2 does not necessarily have the configuration in the present embodiment. For example, the number of arms that form the robot arm 22 may range from one to five or may be seven or more. Further, for example, the type of the robot 2 may be a SCARA robot or a double-arm robot including two robot arms 22.

2. Robot Control Apparatus

The robot control apparatus 5 receives an instruction on the position of the robot 2 from the host computer 6 and independently controls the operation of driving the first driving apparatus 251 to the sixth driving apparatus 256 in such a way that the first arm 221 to the sixth arm 226 are positioned in accordance with the received position instruction. The robot control apparatus 5 is formed, for example, of a computer and includes a processor (CPU) that processes information, a memory communicably coupled to the processor, and an interface with an external component. The memory saves a variety of programs executable by the processor, and the processor can read the variety of programs and other pieces of information stored in the memory and execute the programs.

3. Three-Dimensional Measurement Apparatus

The three-dimensional measurement apparatus 4 according to the embodiment will next be described.

The three-dimensional measurement apparatus 4 three-dimensionally measures the target object W by using a measurement method using patterned light, such as a phase shift method and a space coding method. The three-dimensional measurement apparatus 4 includes a projection section 41, which projects patterned light PL, which is used to perform the three-dimensional measurement and formed of the laser light L, on a region containing the target object W, an imaging section 47, which acquires image data on an imaged region containing the target object W on which the patterned light PL is projected, a control section 48, which controls the operation of driving the projection section 41 and the imaging section 47, a measurement section 49, which three-dimensionally measures the target object W based on the image data, and an enclosure 40, which accommodates the sections described above, as shown in FIG. 2.

In the present embodiment, the enclosure 40 is fixed to the fifth arm 225 of the robot 2, as shown in FIG. 3. The enclosure 40 has a box-like shape and has a bottom surface 401, which is fixed to the fifth arm 225, a top surface 402, which faces the bottom surface 401, a front surface 403, which is located on the side facing the distal end of the fifth arm 225, a rear surface 404, which is located on the side facing the proximal end of the fifth arm 225, and a pair of side surfaces 405 and 406. The thus configured enclosure 40 accommodates the projection section 41, the imaging section 47, the control section 48, and the measurement section 49, as shown in FIG. 4. The shape of the enclosure 40 is, however, not limited to a specific shape.

The enclosure 40 is not necessarily made of a specific material and can be made, for example, of a variety of resins, a variety of metals, and a variety of ceramics. It is, however, noted that a material that excels in thermal conductivity, for example, aluminum and stainless steel is preferably used from the viewpoint of heat dissipation capability. The bottom surface 401 of the enclosure 40 may instead be fixed to the fifth arm 225 of the robot 2 via a joint that is not shown.

The projection section 41 is so disposed in the enclosure 40 as to radiate the laser light L toward the distal end of the fifth arm 225, and the imaging apparatus 47 is so disposed in the enclosure 40 as to face the distal end of the fifth arm 225 and capture an image of a region containing the range irradiated with the laser light L. The front surface 403 of the enclosure 40 is provided with a window 403a, via which the laser light L exits, as shown in FIG. 3.

The three-dimensional measurement apparatus 4 is not necessarily disposed at a specific location and may be disposed at any of the first arm to the fourth arm 224 or the sixth arm 226. The projection section 41 and the imaging section 47 may instead be fixed to differed arms. The control section 48 and the measurement section 49 may be disposed outside the enclosure 40, for example, may be provided as part of the robot control apparatus 5 or the host computer 6.

The projection section 41 has the function of radiating the laser light L toward the target object W to project the patterned light PL, such as that shown in FIG. 5, on the target object W. The thus functioning projection section 41 includes a laser light source 42, which outputs the laser light L, an optical system 44, which includes a plurality of lenses through which the laser light L passes, and an optical scanning section 45, which scans the target object W with the laser light L having passed through the optical system 44, as shown in FIGS. 2 and 4. The laser light source 42 is not limited to a specific light source and can, for example, be a vertical cavity surface emitting laser (VCSEL), a vertical external cavity surface emitting laser (VECSEL), or any other semiconductor laser.

The optical system 44 includes a light collection lens 441, which collects the laser light L outputted from the laser light source 42 into a spot in the vicinity of the target object W, and a rod lens 442, which converts the laser light L collected by the light collection lens 441 into linear laser light L extending in the direction parallel to a swing axis J, which will be described later, that is, in the depth direction with respect to the plane of view of FIG. 2.

The optical scanning section 45 has the function of sweeping the linear laser light L converted by the rod lens 442. The optical scanning section 45 can, for example, be a device that uses a MEMS (Micro Electro Mechanical Systems) mirror to sweep the laser light L.

The optical scanning section 45 according to the present embodiment is formed of MEMS. The optical scanning section 45 includes a mirror 451, which has a reflection surface 450, a permanent magnet 455, which is disposed on the mirror 451, a support 452, which supports the mirror 451, shafts 453, which couple the mirror 451 to the support 452, a first member 457, which is disposed at the support 452, a second member 458, which is coupled to the first member 457, a third member 459, which is coupled to the second member 458, and an electromagnet coil 456, which is so disposed as to face the permanent magnet 455, as shown in FIG. 6. The mirror 451, the support 452, and the shafts 453 form a MEMS substrate 46.

In FIG. 6, the direction in which a normal to the reflection surface 450 in the stationary state extends is defined as follows: A side of the plane of view that is the side facing the reader of the present specification is a +Z-axis direction; and a side of the plane of view that is the side away from the reader is a −Z-axis direction. The direction in which the shafts 453 extend is called an X-axis direction perpendicular to the Z-axis direction. Further, the direction perpendicular to both the Z-axis direction and the X-axis direction is called a Y-axis direction.

In the thus configured optical scanning section 45, the swing axis J, which coincides with the direction in which the linear laser light L extends, that is, a width expansion direction in which the laser light L is expanded by the rod lens 442. When a drive signal is applied to the electromagnetic coil 456, the mirror 451 swings periodically at a predetermined rate alternately in forward and reverse directions around the swing axis J. Thereby, the linear laser light L is scanned in a planar shape. In FIG. 5, the upward/downward direction is the direction in which the linear laser light L extends, and the rightward/leftward direction is the scan direction. The optical scanning section 45 will be described later in detail.

The projection section 41 has been described above but does not necessarily have a specific configuration and may have any configuration that allows the predetermined patterned light PL to be projected on the target object W. For example, the optical system 44 diffuses the laser light L into the linear laser light L in the present embodiment, but not necessarily. For example, MEMS may be used to diffuse the laser light L into the linear laser light L. That is, two optical scanning sections 45 may be used to two-dimensionally sweep the laser light L. Still instead, for example, gimbal-shaped MEMS having freedoms around two axes may be used to two-dimensionally sweep the laser light L.

The imaging section 47 captures an image of the state in which the patterned light PL is projected on at least one target object W. The imaging section 47 is formed, for example, of a camera 471, which includes an imaging device 472, such as a CMOS image sensor and a CCD image sensor, and a light collection lens 473, as shown in FIG. 2. The camera 471 is coupled to the measurement section 49 and sends image data to the measurement section 49.

The control section 48 applies a drive signal to the electromagnetic coil 456 to control the operation of driving the optical scanning section 45 and applies a drive signal to the laser light source 42 to control the operation of driving the laser light source 42. The control section 48 causes the laser light source 42 to output the laser light L in synchronization with the swing motion of the mirror 451 to project the patterned light PL having a stripe pattern expressed by bright and dark portions having large and small luminance values, such as that shown in FIG. 5, on the target object W. The patterned light PL is, however, not necessarily specifically patterned and may be any patterned light that can be used with a measurement method using patterned light, such as a phase shift method and a space coding method. The control section 48 further controls the operation of driving the camera 471 to cause the camera 471 to capture an image of the region containing the target object W at a predetermined timing.

When a phase shift method is used, the control section 48 causes the projection section 41 to project the patterned light PL on the target object W four times with the phase of the patterned light PL shifted by $\pi/2$, and the control section 48 causes the imaging section 47 to capture, whenever the patterned light PL is projected, an image of the target object W on which the patterned light PL has been projected. It is, however, noted that the number of actions of projecting the patterned light PL is not limited to a specific number and may be any number that allows calculation of the phase from the result of the imaging. Instead, a large-interval pattern or conversely, a small-interval pattern may be used to perform the projection and imaging in the same manner, followed by phase connection. The larger the number of types of interval, the greater an increase in the measurement range and improvement in resolution, but increasing the number of imaging actions increases the period necessary for acquisition of image data, resulting in a decrease in operation efficiency of the robot 2. To avoid the decrease in operation efficiency, the number of actions of projecting the patterned light PL may be set as appropriate in consideration of the balance between the accuracy and measurement range of the three-dimensional measurement and the operation efficiency of the robot 2.

The measurement section 49 three-dimensionally measures the target object W based on a plurality of sets of image data acquired by the imaging section 47. Specifically, the measurement section 49 calculates three-dimensional information containing the attitude, the spatial coordinates, and other factors of the target object W. The measurement section 49 then sends the calculated three-dimensional information on the target object W to the host computer 6.

The thus configured control section 48 and measurement section 49 are formed, for example, of a computer that includes a processor (CPU) that processes information, a memory communicably coupled to the processor, and an interface with an external component. The memory saves a variety of programs executable by the processor, and the processor can read the variety of programs and other pieces of information stored in the memory and execute the programs.

4. Host Computer

The host computer 6 produces an instruction on the position of the robot 2 based on the three-dimensional information representing the target object W and calculated by the measurement section 49 and sends the produced position instruction to the robot control apparatus 5. The robot control apparatus 5 independently drives the first driving apparatus 251 to the sixth driving apparatus 256 based on the position instruction received from the host computer 6 to move the first arm 221 to the sixth arm 226 to the instructed position. In the present embodiment, the host computer 6 and the measurement section 49 are separate portions, but not necessarily, and the host computer 6 may have the function of the measurement section 49.

5. Optical Scanning Section

The optical scanning section 45, which is an optical scanner according to the embodiment, will next be described. The configuration of the optical scanning section including no environment detection sensor will be described with reference to FIGS. 1 to 10, and the configuration of the optical scanning section including an environment detection sensor will be described with reference to FIG. 11 and the following figures, as described above.

Figure 7:
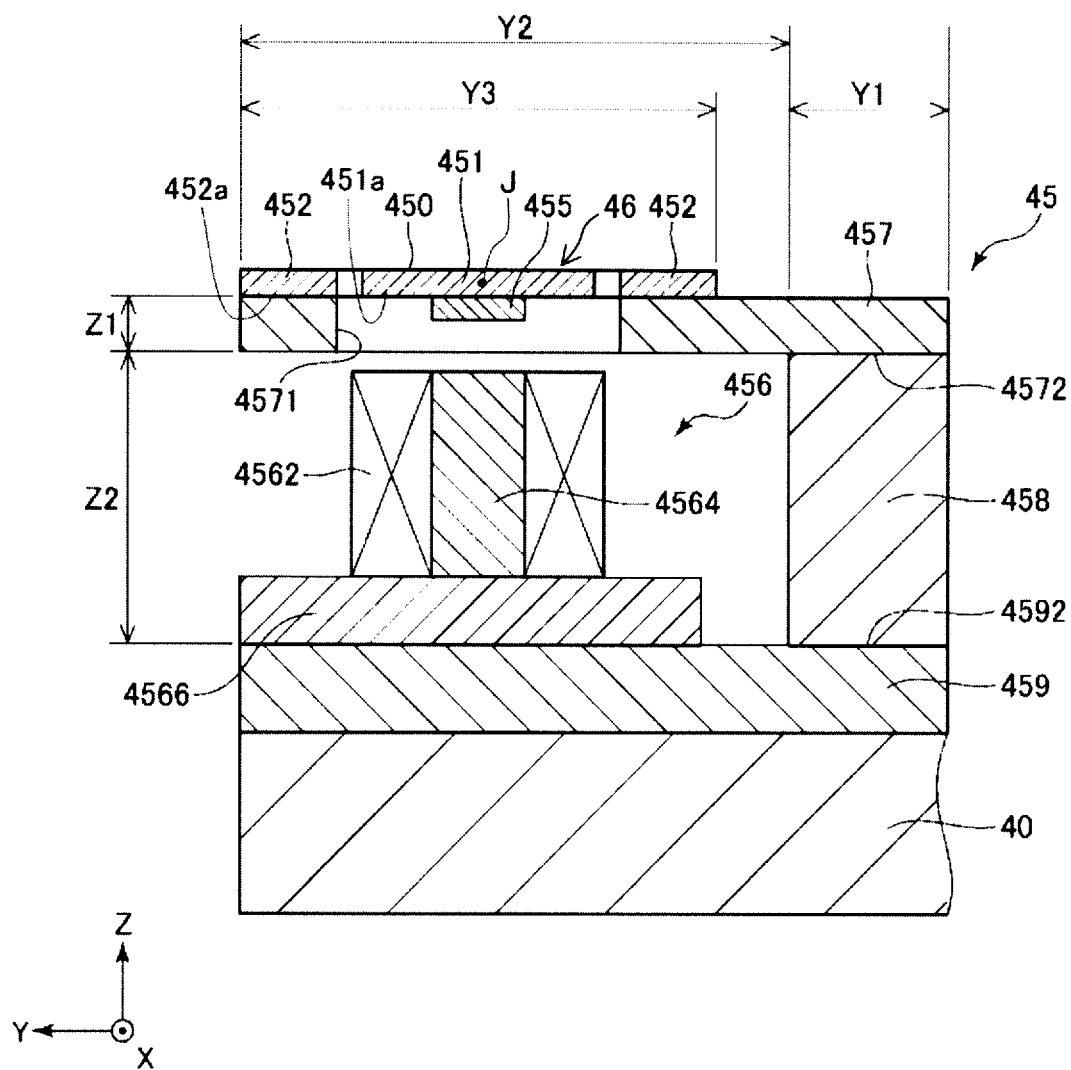
FIG. 7 is a cross-sectional view of the optical scanning section shown in FIG. 6.
Figure 8:
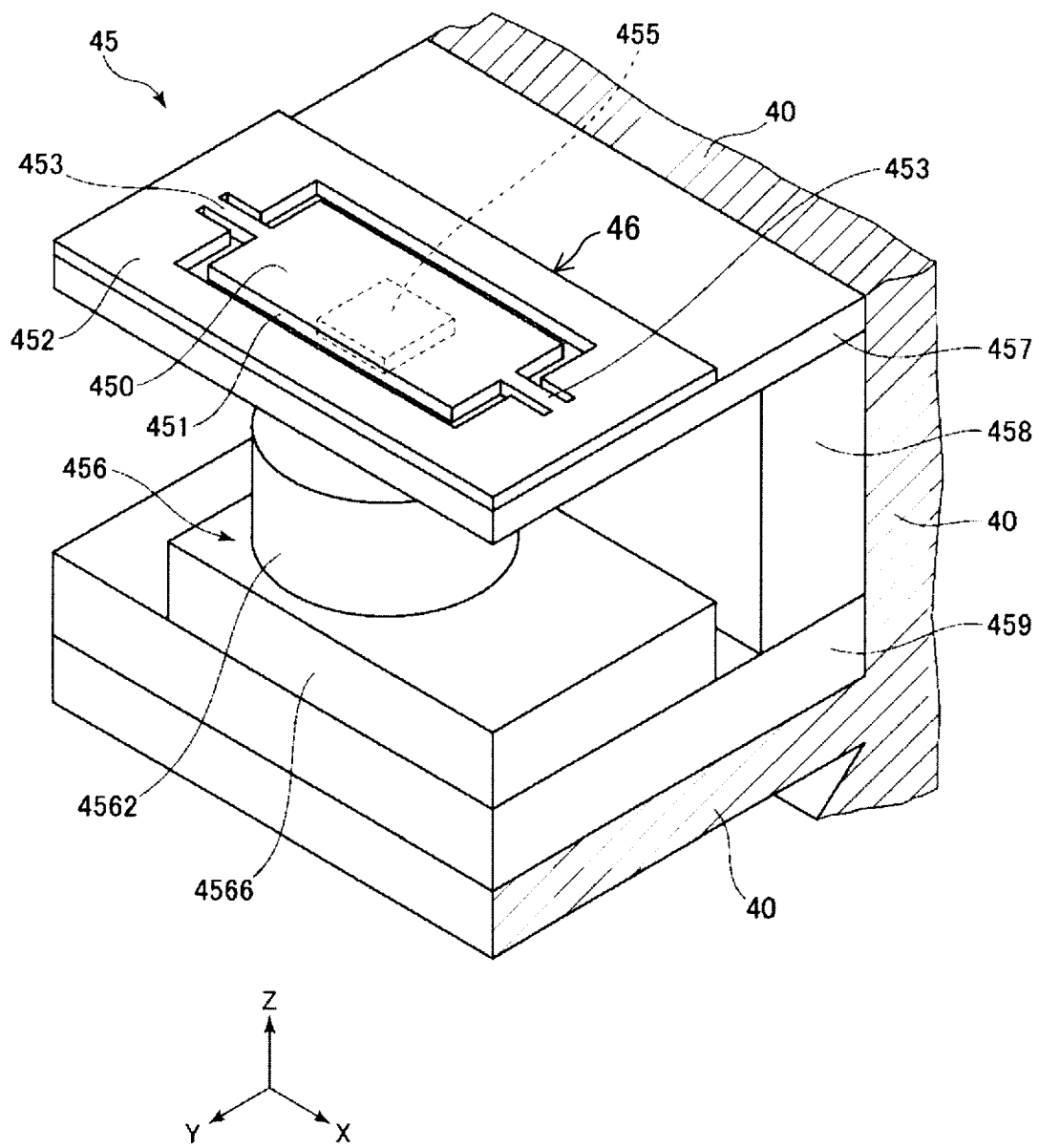
FIG. 8 is a perspective view of the optical scanning section shown in FIG. 7.

FIG. 7 is a cross-sectional view of the optical scanning section shown in FIG. 6. FIG. 8 is a perspective view of the optical scanning section shown in FIG. 7.

The optical scanning section 45 shown in FIGS. 7 and 8 includes the mirror 451, the support 452, the shafts 453, the permanent magnet 455, the electromagnetic coil 456, the first member 457, the second member 458, and the third member 459, as described above. The portions described above will be described below.

The mirror 451 has the reflection surface 450, which reflects light, and a rear surface 451a, which is located on the side opposite the reflection surface 450. The reflection surface 450 reflects the laser light L. A reflection film that is not shown is deposited on the reflection surface 450. For example, a metal film, such as an aluminum film, is used as the reflection film.

The permanent magnet 455 is glued to and disposed on the rear surface 451a and swings along with the mirror 451. The permanent magnet 455 is magnetized in the Y-axis direction perpendicular to the swing axis J. The permanent magnet 455 is, for example, a neodymium magnet, a ferrite magnet, a samarium cobalt magnet, an alnico magnet, or a bonded magnet.

The shafts 453 couple the mirror 451 to the support 452 and support the mirror 451 in such a way that the mirror 451 is swingable around the swing axis 451. The optical scanning section 45 includes two shafts 453, 453, which extend in the X-axis direction, and are so disposed on opposite sides in the X-axis direction with the mirror 451 sandwiched therebetween as to support the mirror 451 from the opposite sides. The shafts 453, 453 undergo torsion deformation in response to the swing motion of the mirror 451 around the swing axis J. The shafts 453, 453 do not necessarily have the shape shown in FIG. 8 and may have any shape that can support the mirror 451 swingably around the swing axis J. For example, the shafts 453, 453 may each be formed of a plurality of beams or may each have a bent or curved portion, a bifurcating portion, a portion having a different width, or any other portion at least at one location in the middle of the direction in which the shaft 453 extends.

The support 452 has a frame-like shape in the plan view viewed in the Z-axis direction and is so disposed as to surround the mirror 451, as shown in FIG. 6. The support 452 swingably supports the mirror 451 via the two shafts 453, 452. The support 452 does not necessarily have a specific shape and may have any shape capable of supporting the mirror 451. For example, the support 452 may be divided into a portion that supports one of the shafts 453 and a portion that supports the other shaft 453.

The first member 457 is glued to and disposed on a rear surface 452a of the support 452. The first member 457 has the function of a reinforcer that reinforces the mechanical strength of the support 452. The thus functioning first member 457 has a plate-like shape that spreads along the plane XY. The first member 457 also has a frame-like shape in the plan view viewed in the Z-axis direction and has an opening 4571, through which a region corresponding to the mirror 451 passes, as shown in FIG. 7. The opening 4571 ensures a space in which the permanent magnet 455 is disposed and a space in which the mirror 451 swings.

Further, the first member 457 extends in the −Y-axis direction beyond the support 452. A −Y-axis-direction end portion of the first member 457 is coupled to the second member 458. Specifically, out of the −Z-axis-direction surface of the first member 457, the −Y-axis-direction end portion forms a support surface 4572, which is supported by the second member 458.

The second member 458 is so shaped as to have a longitudinal axis in the Z-axis direction. The +Z-axis-direction end surface of the second member 458 is coupled to the first member 457, and the −Z-axis-direction end surface of the second member 458 is coupled to the third member 459. The second member 458 is therefore interposed between the first member 457 and the third member 459. A space as long as the longitudinal axis of the second member 458 is thus formed between the first member 457 and the third member 459.

The third member 459 has a plate-like shape that spreads along the plane XY. A −Y-axis-direction end portion of the third member 459 is coupled to the second member 458. Specifically, out of the +Z-axis-direction surface of the third member 459, the −Y-axis-direction end portion forms a support surface 4592, which supports the second member 458.

The electromagnetic coil 456 is disposed between the first member 457 and the third member 459. The electromagnetic coil 456 produces Lorentz force in the static magnetic field produced by the permanent magnet 455 when AC current is conducted through the electromagnetic coil 456, and the thus produced Lorentz force causes the mirror 451 on which the permanent magnet 455 is disposed to swing. The electromagnetic driving method described above allows generation of large driving force, whereby the mirror 451 can swing by a large angle with the drive voltage lowered.

In the thus configured optical scanning section 45, the second member 458 supports the first member 457 in the form of a cantilever. Supporting in the form of a cantilever refers to a structure in which a +Y-axis-direction end portion of the first member 457 is not supported or forms what is called a free end portion whereas the −Y-axis-direction end portion of the first member 457 is supported by the second member 458, as shown, for example, in FIG. 7. According to the thus configured cantilever support structure, for example, even when the temperatures of the first member 457 and the second member 458 increase so that thermal stress is induced, and the first member 457 is warped, an influence resulting from the warp can be corrected.

Figure 9:
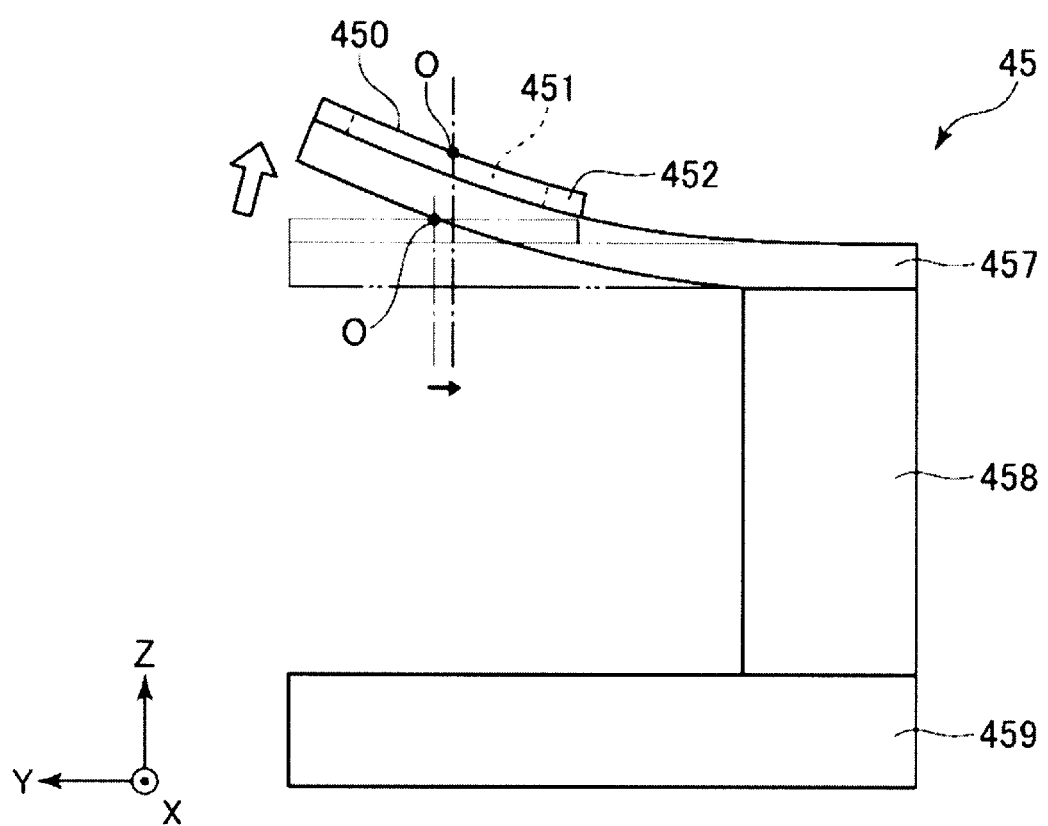
FIG. 9 shows a state in which a first member is warped because the temperature of the optical scanning section increases.
Figure 10:
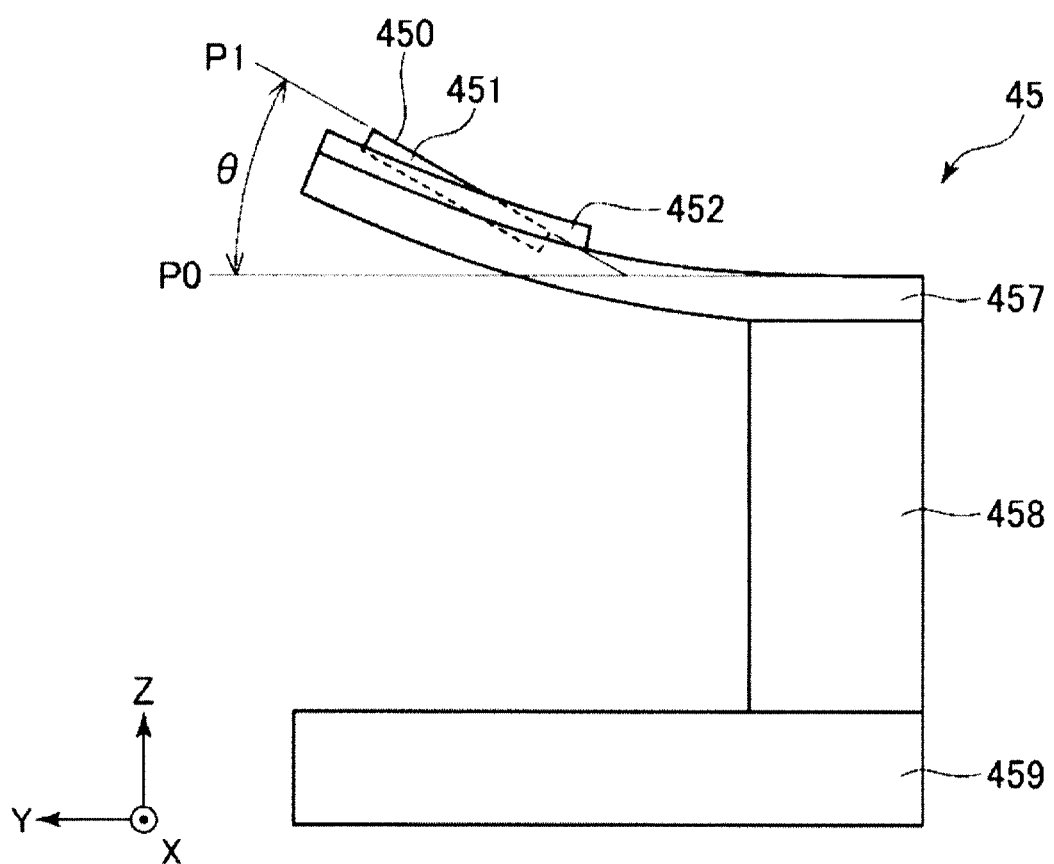
FIG. 10 shows the state in which the first member is warped because the temperature of the optical scanning section increases.

Specifically, FIGS. 9 and 10 show the state in which the temperature of the optical scanning section 45 shown in FIG. 7 increases and the resultant thermal stress warps the first member 457. FIGS. 9 and 10 are simplified figures for convenience of the description.

When the temperature of the optical scanning section 45 increases, thermal stress is induced in the vicinity of the boundaries among the first member 457, the second member 458, and the third member 459. The thermal stress is likely to manifest itself in the form of a warp of the first member 457. An end portion of the first member 457 that is the end portion at which the mirror 451 is disposed is so warped that the end portion is displaced in the +Z-axis direction, as shown in FIG. 9. The center O of the reflection surface 450 thus moves in the −Y-axis direction when the warp occurs.

Further, the warp also causes a problem of unintentional inclination of the reflection surface 450, as compared with a case where no warp occurs. Specifically, a reference plane P0 is defined as a plane containing the reflection surface 450 in the state in which no warp occurs and the mirror 451 does not swing. When the warp occurs, the shafts 453, 354 undergo torsion deformation, resulting in unintentional inclination of the reflection surface 450 with respect to the reference plane P0. As a result, a plane P1 containing the warped reflection surface 450 inclines by an angle 8 with respect to the reference plane P0, as shown in FIG. 10.

The movement of the center O of the reflection surface 450 and the inclination of the reflection surface 450 described above cause a shift of the center of the patterned light PL having a stripe pattern and projected on the target object W described above from an intended position. As a result, a problem of a decrease in accuracy of the three-dimensional measurement occurs.

To avoid the problem, the second member 458 supports the first member 457 in the form of a cantilever in the present embodiment, as described above. A support direction in which the cantilever is supported, that is, the direction from an end portion of the first member 457 that is the end portion not supported toward an end portion of the first member 457 that is the end portion supported by the second member 458 is so set as to intersect the swing axis J. The intersection angle may be smaller than 90°. However, in the present embodiment, in particular, the support direction is parallel to the Y-axis direction, and the swing axis J is parallel to the X-axis direction. The support direction therefore intersects the swing axis J at 90°.

According to the cantilever support structure described above, even when the first member 457 is warped as shown in FIGS. 9 and 10, and the center of the patterned light PL is shifted accordingly, the direction of the shift is allowed to coincide with the direction in which the patterned light PL is swept when the mirror 451 swings. Therefore, even when the center of the patterned light PL is shifted, the shift can be corrected by adjustment of the angle of the swing motion of the mirror 451. As a result, the center of the patterned light PL is allowed to return to the intended position, whereby a decrease in accuracy of the three-dimensional measurement can be suppressed.

Specifically, to project an image with the patterned light PL swept, AC current is typically applied to the electromagnetic coil 456 to cause the mirror 451 to periodically swing at a fixed rate. The patterned light PL is thus swept back and force by a fixed amplitude to draw the stripe pattern. To correct the position of the center of the patterned light PL, DC current is superimposed on the AC current. The superposition of the DC current on the AC current allows the median of the width of the angle of the swing motion of the mirror 451 to be shifted in accordance with the voltage value of the DC current, that is, what is called DC offset operation to be performed. As a result, the position of the center of an image drawn by the patterned light PL can be corrected, whereby a decrease in accuracy of the three-dimensional measurement can be suppressed.

As described above, the optical scanning section 45, which is an optical scanner according to the present embodiment, includes the mirror 451, which has the reflection surface 450, which reflects light, and the rear surface 451a (first rear surface), which is located on the side opposite the reflection surface 450, the permanent magnet 455, which is disposed on the rear surface 451a of the mirror 451, the support 452, which supports the mirror 451 and has the rear surface 452a, which is located on the side where the rear surface 451a is present, the shafts 453, 453, which couple the mirror 451 to the support 452 and allow the mirror 451 to swing around the swing axis J, the first member 457, which is disposed on the rear surface 452a of the support 452, the second member 458, which supports the first member 457 in the form of a cantilever in the direction perpendicular to the swing axis J and extending along the rear surface 452a, the third member 459, which is so disposed as to face the first member 457 via the second member 458 and coupled to the second member 458, and the electromagnetic coil 456, which is disposed between the first member 457 and the third member 459.

In the thus configured optical scanning section 45, the second member 458 supports the first member 457 in the form of a cantilever, and the support direction intersects the swing axis J. Therefore, even when the thermal stress is induced to warp the first member 457, the shift of the position of an image drawn by the patterned light PL due to the warp can be corrected by adjustment of the angle of the swing motion of the mirror 451. Therefore, the optical scanning section 45 according to the present embodiment allows the reflection surface 450 to sweep the light with precise positioning even when the temperature of the optical scanning section 45 changes.

The temperature of the optical scanning section 45, the acceleration exerted on the optical scanning section 45, and the atmospheric pressure and the magnetic field around the optical scanning section 45, and other environmental factors are correlated in a given sense with the amount of shift of the position of the patterned light PL. Therefore, to perform the DC offset described above, the voltage value of the DC current in the DC offset may be so set that the amount of shift estimated from environmental index values, such as the temperature of the optical scanning section 45, the acceleration exerted on the optical scanning section 45, and the atmospheric pressure and the magnetic field around the optical scanning section 45, and other environmental factors is canceled based on the correlation acquired in advance. Similarly, the AC current described above may also be corrected based on the correlation.

The optical scanning section 45 preferably includes an environment detection sensor. The environment detection sensor can detect the environmental index values, such as the temperature of the optical scanning section 45 and the atmospheric pressure around the optical scanning section 45, whereby the correction using the DC offset and the correction using the AC current can be performed more accurately. The environment detection sensor may be provided in a position where the environment detection sensor is in contact with the optical scanning section 45 or in an arbitrary position in the enclosure 40. The environment detection sensor may instead be provided outside the enclosure 40 in consideration of influences of the environmental index values. The configuration in which the environment detection sensor is provided will be described with reference to FIG. 11 and the following figures.

In the present embodiment, in the plan view of the reflection surface 450 viewed in the Z-axis direction, the support surface 4572, where the second member 458 supports the first member 457, is shifted from the mirror 451 and the shafts 453. Further, the support surface 4572 is also shifted from the support 452 in the present embodiment.

The configuration described above makes the effect provided by the cantilever support structure described above more marked. That is, the shift described above can ensure a distance between the support surface 4572, where thermal stress is likely to be induced, and the mirror 451. The distance can suppress, even when thermal stress in induced at the support surface 4572, the warp or any other type of deformation of the first member 457 in the vicinity of the mirror 451. The term "shifted" described above refers to the situation in which no superimposed portion is present.

In the present embodiment, the support surface 4572, where the first member 457 is supported by the second member 458, has an oblong shape having a longitudinal axis parallel to the swing axis J, as shown in FIG. 6. The support surface 4572 and the swing axis J is therefore separated from each other by a uniform distance. As a result, for example, even when the first member 457 is warped, the shift of the position of an image drawn by the patterned light PL can be precisely corrected by adjustment of the angle of the swing motion of the mirror 451.

In the present specification, the term "parallel" conceptually accepts discrepancy resulting from a manufacturing error. The amount of discrepancy resulting from a manufacturing error is, for example, about ±5°. Similarly, the term "perpendicular" conceptually accepts discrepancy resulting from a manufacturing error. The amount of discrepancy resulting from a manufacturing error is, for example, about ±5°.

An X-axis-direction length X1 of the support surface 4572, that is, the length of the longitudinal axis thereof is not limited to a specific value and is preferably greater than or equal to 5 mm but smaller than or equal to 30 mm, more preferably, greater than or equal to 7 mm but smaller than or equal to 15 mm.

A Y-axis-direction length Y1 of the support surface 4572 is not limited to a specific value and is preferably greater than or equal to 2 mm but smaller than or equal to 5 mm.

Further, let Y2 [mm] be the Y-axis-direction length of a portion of the first member 457 that is the portion not supported at the support surface 4572, and the ratio Y2/Y1 is preferably greater than or equal to 1.2 but smaller than or equal to 3.0, more preferably, greater than or equal to 1.5 but smaller than or equal to 2.5. Setting the ratio Y2/Y1 to fall within any of the ranges described above can ensure a sufficient area of the mirror 451 provided in the portion that is not supported at the support surface 4572 and can further ensure sufficient support strength at the support surface 4572.

A Y-axis-direction length Y3 of the support 452 is preferably shorter than the length Y2 and preferably greater than or equal to 3 mm but smaller than or equal to 10 mm by way of example.

On the other hand, a Z-axis-direction length Z1 of the first member 457*m*, that is, the thickness of the first member 457 is not limited to a specific value and is preferably greater than or equal to 0.2 mm but smaller than or equal to 2.0 mm, more preferably, greater than or equal to 0.3 mm but smaller than or equal to 1.0 mm. The thus set ranges can avoid a situation in which the first member 457 prevents the permanent magnet 455 and the electromagnetic coil 456 from being close enough to each other, with the deformation of the first member 457 suppressed.

A Z-axis-direction length Z2 of the second member 458, that is, the height of the second member 458 is not limited to a specific value and is preferably greater than or equal to 2.5 mm but smaller than or equal to 8.0 mm, more preferably, greater than or equal to 3.0 mm but smaller than or equal to 6.0 mm. The thus set ranges can ensure a sufficient gap between the first member 457 and the third member 459, whereby the electromagnetic coil 456 having a sufficient size can be disposed. Further, a sufficiently long Z-axis-direction heat conducting path of the second member 458 can be ensured, whereby the heat transmitted to the third member 459 is unlikely to be transferred to the first member 457. As a result, the first member 457 is more unlikely to be deformed.

The thermal conductivity of the third member 459 is preferably higher than the thermal conductivity of the second member 458. The thus set thermal conductivity can lower thermal resistance between the third member 459 and the electromagnetic coil 456 disposed on the upper surface of the third member 459. As a result, the heat generated by the electromagnetic coil 456 is likely to be transmitted to the third member 459. An increase in the temperature of the electromagnetic coil 456 can thus be suppressed, whereby distortion due to increases in the temperatures of the first member 457 and the mirror 451 resulting from heat radiation can be suppressed. On the other hand, since the thermal resistance between the third member 459 and the second member 458 increases, the heat transmitted to the third member 459 is unlikely to be transmitted to the second member 458. An increase in the temperature of the second member 458 can therefore be suppressed, whereby induction of thermal stress, for example, at the interface between the second member 458 and the third member 459 and the interface between the second member 458 and the first member 457 can be suppressed. As a result, the warp or any other type of deformation of the first member 457 can be suppressed.

The difference in thermal conductivity between the third member 459 and the second member 458 is preferably greater than or equal to 10 W/m-K, more preferably, greater than or equal to 20 W/m-K. The thermal conductivity of the third member 459 is preferably greater than or equal to 50 W/m-K, more preferably, greater than or equal to 100 W/m-K.

On the other hand, the coefficient of thermal expansion of the first member 457 is preferably equal to the coefficient of thermal expansion of the second member 458. The thus set coefficient of thermal expansion hardly causes a difference in thermal expansion between the first member 457 and the second member 458 resulting from a change in temperature of the optical scanning section 45. Thermal stress is therefore unlikely to be induced at the support surface 4572, whereby the deformation of the first member 457, in particular, can be suppressed to a small degree. The coefficient of thermal expansion of the first member 457 is preferably equal to the coefficient of thermal expansion of the support 452. The thus set coefficient of thermal expansion hardly causes a difference in thermal expansion between the first member 457 and the support 452 resulting from a change in temperature of the optical scanning section 45. Thermal stress is therefore unlikely to be induced at the rear surface 452a of the support 452, whereby deformation of the support 452, in particular, can be suppressed to a small degree. The coefficient of thermal expansion of the first member 457 is preferably equal to the coefficient of thermal expansion of the shafts 453. The thus set coefficient of thermal expansion hardly causes a difference in thermal expansion between the first member 457 and the shafts 453 resulting from a change in temperature of the optical scanning section 45. Deformation of the shafts 453, in particular, can therefore be suppressed to a small degree even when the temperature of the atmosphere around the first member 457 and the shafts 453 changes. The coefficient of thermal expansion of the first member 457 is preferably equal to the coefficient of thermal expansion of the mirror 451. The thus set coefficient of thermal expansion hardly causes a difference in thermal expansion between the first member 457 and the mirror 451 resulting from a change in temperature of the optical scanning section 45. Deformation of the mirror 451, in particular, can therefore be suppressed to a small degree even when the temperature of the atmosphere around the first member 457 and the mirror 451 changes. The situation in which the coefficients of thermal expansion are equal to each other means that the difference in the coefficient of thermal expansion is smaller than or equal to $1.0 \times 10^{-6}$/K.

Examples of the materials of which the first member 457 and the second member 458 are made may include Pyrex glass (registered trademark), Tempax glass (registered trademark), borosilicate glass, quartz glass, and other glass materials, silicon, ceramics, and metals. Among them, the glass materials are preferably used. The glass materials, which have relatively low thermal conductivity, suppress increases in temperatures of the first member 457 and the second member 458. The deformation of the first member 457 can therefore be effectively suppressed. Borosilicate glass has a coefficient of linear expansion close to that of silicon and is therefore preferably used, for example, when the support 452 is made of a silicon-based material.

On the other hand, examples of the material of which the third member 459 is made may include aluminum, aluminum alloys, stainless steel, copper, copper alloys, nickel, nickel alloys, and other metal materials. Among them, aluminum and aluminum alloys are preferably used. Aluminum and aluminum alloys have relatively high thermal conductivity and can therefore efficiently transmit the heat generated by the electromagnetic coil 456.

The first member 457 and the second member 458 are glued or bonded to each other. Further, the second member 458 and the third member 459 are also glued or bonded to each other. To glue the members to each other, for example, an epoxy-based adhesive, a silicone-based adhesive, an acrylic adhesive, or any of a variety of other adhesives is used. To bond the members described above to each other, for example, direct bonding may be used.

The position of the boundary surface between the second member 458 and the third member 459 is not limited to the position shown in FIG. 7. For example, the boundary surface shown in FIG. 7 may be shifted in the +Z-axis direction. In this case, however, since the thermal resistance of the second member 458 decreases by the amount corresponding to a decrease in the height of the second member 458, and the third member 459 has an L-letter-like shape in the plan view viewed in the X-axis direction, resulting in an increase in manufacturing cost. The position shown in FIG. 7 is therefore preferable.

Examples of the material of which the support 452 is made may include silicon, silicon oxides, silicon nitrides, and other silicon-based material. Specifically, the support 452 and the shafts 453, 453 coupled thereto, and the mirror 451 can be formed, for example, by patterning an SOI (silicon on insulator) substrate.

On the other hand, the first member 457 and the support 452 are glued to each other, for example, with any of the adhesives described above, and so are the mirror 451 and the permanent magnet 455.

The three-dimensional measurement apparatus 4 shown in FIG. 1 includes the enclosure 40, which accommodates the projection section 41, and the third member 459 of the optical scanning section 45 (optical scanner) is coupled to the enclosure 40, as shown in FIGS. 1 and 8. For example, the third member 459 and the enclosure 40 are in intimate contact with each other via gluing, metal bonding, screwing, or any other method. Coupling the third member 459 to the enclosure 40 allows the heat transmitted to the third member 459 to be further dissipated toward the enclosure 40. A situation in which the heat stays in the third member 459 is thus suppressed, and the heat transmission to the second member 458 is suppressed. As a result, deformation of the first member 457 can be further suppressed.

The electromagnetic coil 456 shown in FIG. 7 includes a winding 4562, a first magnetic core 4564, which is inserted into the winding 4562, and a second magnetic core 4566, which supports the first magnetic core 4564. The second magnetic core 4566 has a plate-like shape and is disposed on the +Z-axis-direction surface of the third member 459. The first magnetic core 4564 has a circular columnar shape and is coupled to the second magnetic core 4566.

The control section 48 applies the AC current and the DC current to the winding 4562 via wiring that is not shown. The first magnetic core 4564 and the second magnetic core 4566 are each a magnetic path adjustment core. Providing the thus configured first magnetic core 4564 and second magnetic core 4566 allows adjustment of the magnetic path and an increase in torque that causes the mirror 451 to swing. The electric power consumed by the electromagnetic coil 456 can thus be lowered.

Since the second magnetic core 4566 is coupled to the third member 459, heat generated in the winding 4562 is likely to be transmitted to the third member 459. As a result, an increase in temperature of the electromagnetic coil 456 can thus be further reduced.

Examples of the materials of which the first magnetic core 4564 and the second magnetic core 4566 are made may include Mn—Zn-based ferrite, Ni—Zn-based ferrite, and a variety of other soft ferrite materials.

As described above, the three-dimensional measurement apparatus 4 according to the present embodiment is an apparatus that three-dimensionally measures the target object W by using the laser light L and includes the projection section 41, which includes the optical scanning section 45, which is an optical scanner that projects the patterned light PL formed of the laser light L on the region containing the target object W, the imaging section 47, which captures an image of the region containing the target object W irradiated with the laser light L to acquire image data, the control section 48, which controls the operation of driving the projection section 41 and the imaging section 47, and the measurement section 49, which three-dimensionally measures the region containing the target object W based on the image data. The optical scanning section 45 includes the mirror 451, which has the reflection surface 450, which reflects light, and the rear surface 451a, which is located on the side opposite the reflection surface 450, the permanent magnet 455, which is disposed on the rear surfaces 451a of the mirror 451, the support 452, which supports the mirror 451 and has the rear surface 452a, which is located on the side where the rear surface 451a is present, the shafts 453, 453, which couple the mirror 451 to the support 452 and allow the mirror 451 to swing around the swing axis J, the first member 457, which is disposed on the rear surface 452a of the support 452, the second member 458, which supports the first member 457 in the form of a cantilever in the direction perpendicular to the swing axis J and extending along the rear surface 452a, the third member 459, which is so disposed as to face the first member 457 via the second member 458 and coupled to the second member 458, and the electromagnetic coil 456, which is disposed between the first member 457 and the third member 459.

In the thus configured optical scanning section 45 of the three-dimensional measurement apparatus 4, the second member 458 supports the first member 457 in the form of a cantilever, and the support direction intersects the swing axis J. Therefore, even when the thermal stress is induced to warp the first member 457, the shift of the position of an image drawn by the patterned light PL due to the warp can be corrected by adjustment of the angle of the swing motion of the mirror 451. Therefore, the optical scanning section 45 allows the reflection surface 450 to sweep the light with precise positioning even when the temperature of the optical scanning section 45 changes. As a result, the three-dimensional measurement apparatus 4 can perform high-precision three-dimensional measurement.

The robot system 1 according to the present embodiment includes the robot 2, which includes the robot arm 22, the three-dimensional measurement apparatus 4, which is installed on the robot arm 22 and three-dimensionally measures the target object W by using the laser light L, and the robot control apparatus 5, which controls the operation of driving the robot 2 based on the result of the measurement performed by the three-dimensional measurement apparatus 4.

In the thus configured robot system 1, the three-dimensional measurement apparatus 4 performs high-precision three-dimensional measurement, as described above. Three-dimensional information on the target object W can therefore be accurately grasped, whereby the robot 2 can perform a variety of types of work on the target object W with high precision.

Table 1 below shows results of analysis performed on two models in which the second member 458 of the optical scanning section 45 shown in FIG. 7 is made of different materials. The analysis is stress analysis for determining how much the center of the reflection surface 450 moves and how much the reflection surface 450 angularly inclines when the temperature of the optical scanning section 45 is changed. Table 1 shows comparison of the results between the two models.

In the first model of the optical scanning section 45, the mirror 451 and the support 452 are each made of silicon, the first member 457 is made of Tempax glass (registered trademark), and the second member 458 and the third member 459 are each made of aluminum. In the first model, the support 452 and the first member 457 are glued to each other with an adhesive at the interface therebetween, the first member 457 and the second member 458 are glued to each other with an adhesive at the interface therebetween, and the second member 458 and the third member 459 are integrated with each other with an adhesive at the interface therebetween.

In the second model of the optical scanning section 45, the second member 458 and the support 452 are separate components, the second member 458 is made of Tempax glass (registered trademark), the third member 459 is made of aluminum, and other points in the second model are the same as those in the first model. In the second model, the second member 458 and the third member 459 are glued to each other with an adhesive at the interface therebetween.

The behavior of the reflection surface 450 when the temperature of the optical scanning section 45 changes from 5° C. to 60° C. has been calculated by using FEM (Finite Element Method) in the two models.

TABLE 1

|  |  | First model (Second member is made of aluminum) | Second model (Second member is made of glass) |
|---|---|---|---|
| Amount of movement of center of reflection surface [μm] | X-axis direction | 0 | 0 |
|  | Y-axis direction | −3 | 0 |
|  | Z-axis direction | 15 | 1 |
| Angle of inclination of reflection surface [°] |  | 0.12 | −0.02 |

As a result, Table 1 shows that in the second model, in which the second member 458 is made of a glass material, the amount of movement of the center of the reflection surface 450 and the angle of inclination of the reflection surface 450 are each smaller than those in the first model, in which the second member 458 is made of aluminum, even when the temperature of the optical scanning section 45 changes. The result proves that it is preferable that the thermal conductivity of the thermal conductivity is higher than the thermal conductivity of the second member 458, the coefficient of linear expansion of the first member 457 is equal to the coefficient of linear expansion of the second member 458, and the first member 457 and the second member 458 are each made of a glass material.

The configuration of the optical scanning section 45 described with reference to FIGS. 6 to 10 is presented by way of example, and a different configuration may be employed. For example, the first member 457 is supported in the form of a cantilever in the configuration described above, and both ends of the first member 457 may instead be supported.

6. Optical Scanning Section Including Environment Detection Sensor

Figure 11:
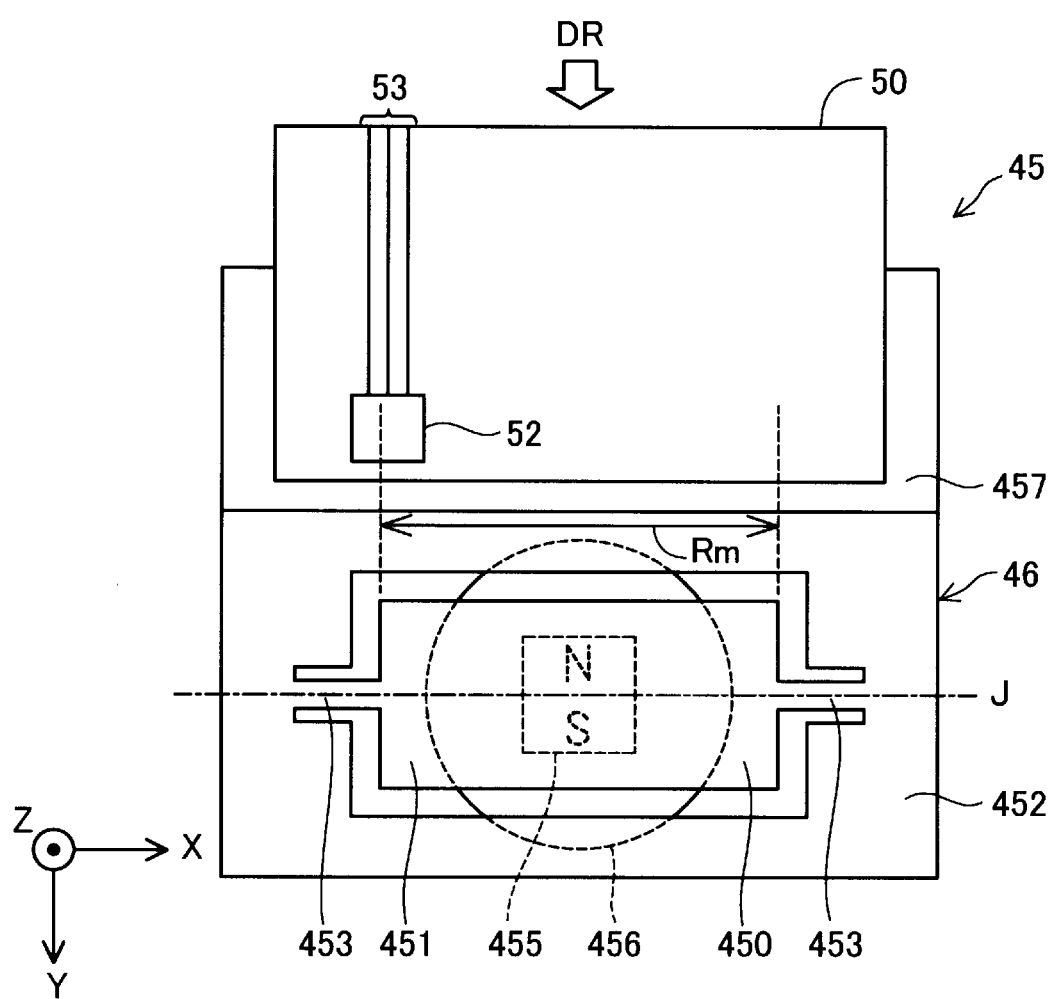
FIG. 11 is a plan view showing an example of the configuration of the optical scanning section provided with an environment detection sensor.
Figure 12:
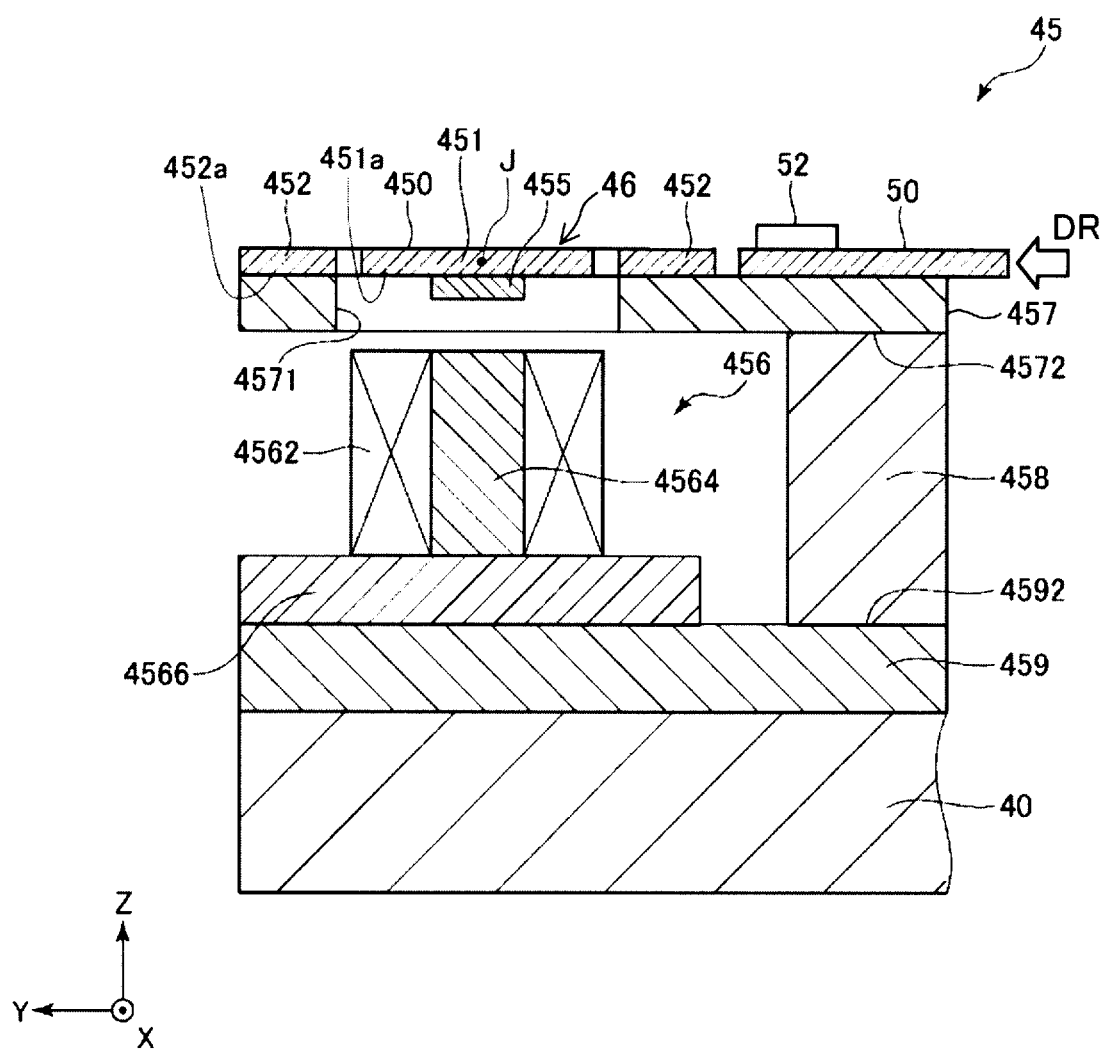
FIG. 12 is a cross-sectional view showing the example of the configuration of the optical scanning section provided with the environment detection sensor.

FIG. 11 is a plan view showing an example of the configuration of the optical scanning section 45 provided with an environment detection sensor 52, and FIG. 12 is a cross-sectional view of the optical scanning section 45 shown in FIG. 11. FIG. 11 shows that a wiring substrate 50 and the environment detection sensor 52 are added to the configuration shown in FIG. 6 described above, and FIG. 12 shows that the wiring substrate 50 and the environment detection sensor 52 are added to the configuration shown in FIG. 7 described above. The environment detection sensor 52 is disposed on the wiring substrate 50, and wiring 53 for the environment detection sensor 52 is formed in the wiring substrate 50.

The environment detection sensor 52 can be any of a variety of sensors that detect the environmental index values associated with the mirror 451. Examples of the environmental index values may include the temperature, acceleration, atmospheric pressure, magnetic field, and other factors, and the environment detection sensor 52 may include, for example, at least one of a temperature sensor, an inertia sensor, a pressure sensor, and a magnetism sensor. In the following description, a temperature sensor is used as the environment detection sensor 52.

The MEMS substrate 46 is fixed to the first member 457, as described above. In the following description, the first member 457 is called a "substrate fixing section 457." The environment detection sensor 52 is desired to be disposed in a position as nearest as possible to the mirror 451. However, depending on the position where the sensor is provided, stress undesirable for the mirror 451 and the MEMS substrate 46 is induced, resulting in unstable swing motion of the mirror 451. To avoid the problem, in the present embodiment, the environment detection sensor 52 is disposed in a position where the environment detection sensor 52 can detect the environmental factors associated with the mirror 451 without causing unstable swing motion of the mirror 451, as will be described below.

The environment detection sensor 52 is disposed in a position where the environment detection sensor 52 overlaps or is adjacent to the substrate fixing section 457 but does not overlap with the MEMS substrate 46 in the plan view viewed in the direction perpendicular to a surface of the MEMS substrate 46, as shown in FIG. 11. The surface of the MEMS substrate 46 is the surface opposite the surface fixed to the first member 457. In the present disclosure, the term "overlap" means that two elements at least partially overlap with each other. The environment detection sensor 52 and the MEMS substrate 46 are disposed at different heights in the direction Z, as shown in FIG. 12. In other words, the environment detection sensor 52 is disposed in a position where the environment detection sensor 52 does not overlap with the MEMS substrate 46 in a side view viewed in a direction DR parallel to the surface of the MEMS substrate 46 and perpendicular to the swing axis J. The environment detection sensor 52 disposed in such a position can detect the environmental factors associated with the mirror 451 without causing unstable swing motion of the mirror 451. Instead of disposing the environment detection sensor 52 in a position where the environment detection sensor 52 overlaps with the substrate fixing section 457 in the plan view of FIG. 11, the environment detection sensor 52 may be disposed in a position adjacent to the substrate fixing section 457.

The plan view of FIG. 11 shows a mirror range Rm, which represents the segment extending between the opposite ends of the mirror 451 along the swing axis J but shifted in the direction perpendicular to the swing axis J. Assuming that the mirror range Rm is defined, the environment detection sensor 52 is preferably disposed in a position where the environment detection sensor 52 overlaps with the mirror range Rm. The environment detection sensor 52 can thus be disposed in a position close to the mirror 451.

The wiring substrate 50 overlaps with part of the region of the substrate fixing section 457 in the plan view shown in FIG. 11. When the wiring substrate 50 on which the environment detection sensor 52 is disposed is so disposed as to overlap with part of the substrate fixing section 457 as described above, the environment detection sensor 52 can be disposed in a position close to the mirror 451. The environment detection sensor 52 may instead be disposed in the vicinity of the mirror 451 without use of the wiring substrate 50. Using the wiring substrate 50, however, allows the environment detection sensor 52 to be disposed and the wiring 53 for the environment detection sensor 52 to be laid at the same time, whereby the optical scanning section 45 can be readily produced.

Figure 13:
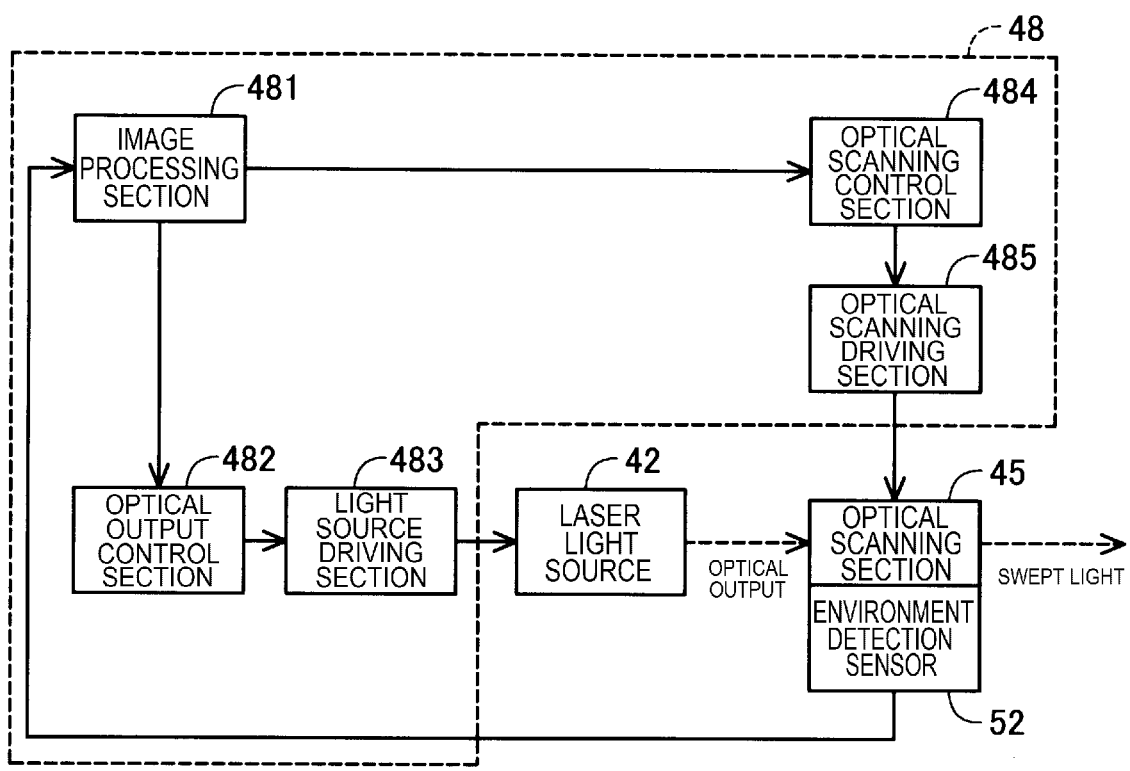
FIG. 13 is a block diagram of a configuration for controlling the optical scanning section by using the result of the detection performed by the environment detection sensor.

FIG. 13 is a block diagram of a configuration for controlling the optical scanning section 45 by using the result of the detection performed by the environment detection sensor 52. The control section 48 includes an image processing section 481, an optical output control section 482, a light source driving section 483, an optical scanning control section 484, and an optical scanning driving section 485.

The image processing section 481 supplies the optical output control section 482 with image data for forming the linear patterned light PL. The optical output control section 482 supplies the light source driving section 483 with a control signal for forming the patterned light PL in accordance with the image data. The light source driving section 483 drives the laser light source 42 in accordance with the control signal. The laser light L outputted from the laser light source 42 is swept by the optical scanning section 45, as described above. The optical scanning control section 484 supplies the optical scanning driving section 485 with a control signal for sweeping the patterned light PL in accordance with a timing signal provided from the image processing section 481. The optical scanning driving section 485 causes the mirror 451 of the optical scanning section 45 to swing in accordance with the control signal. Specifically, the optical scanning driving section 485 applies a drive signal to the electromagnetic coil 456 to cause the mirror 451 to periodically swing at a predetermined rate alternately in the forward and reverse directions around the swing axis J. The result of the detection performed by the environment detection sensor 52 is sent to the image processing section 481 and used to control the scanning state of the optical scanning section 45.

Figure 14:
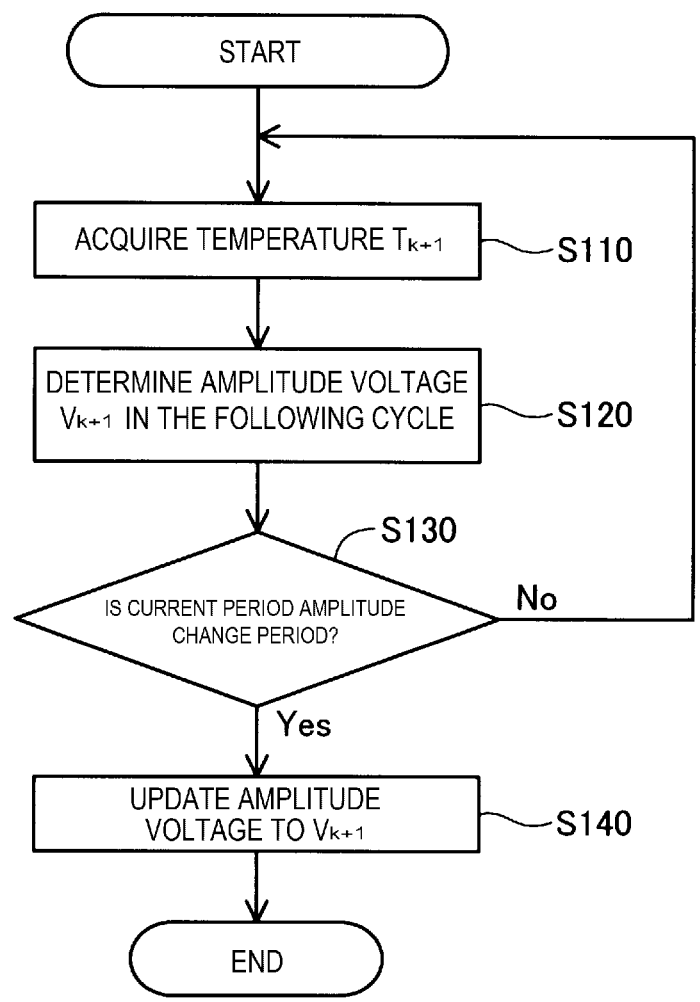
FIG. 14 is a flowchart of processes carried out to control a mirror angle in accordance with the result of the detection performed by the environment detection sensor.

FIG. 14 is a flowchart of processes carried out to control the mirror angle in accordance with the result of the detection performed by the environment detection sensor 52. The processes are periodically carried out at a fixed rate by the control section 48 during the action of the optical scanning section 45. In step S110, a current temperature $T_{k+1}$ is acquired as one of the environmental index values. The temperature $T_{k+1}$ is detected with the environment detection sensor 52. The environmental index value may be another environmental index value, such as the acceleration, atmospheric pressure, or the magnetic field. In step S120, amplitude voltage $V_{k+1}$ in the following driving cycle in accordance with which the mirror 451 is driven is determined in accordance with the detected temperature $T_{k+1}$. The "amplitude voltage $V_{k+1}$" means voltage indicated by the drive signal supplied to the electromagnetic coil 456. In step S130, it is evaluated whether or not the current period is an amplitude change period. When the result of the evaluation shows that the current period is not the amplitude change period, the control returns to step S110. On the other hand, when the result of the evaluation shows that the current period is the amplitude change period, the control proceeds to step S140, where the amplitude voltage is updated to the amplitude voltage $V_{k+1}$ in the following cycle determined in step S120, and the mirror 451 is driven with the updated amplitude voltage.

Figure 15:
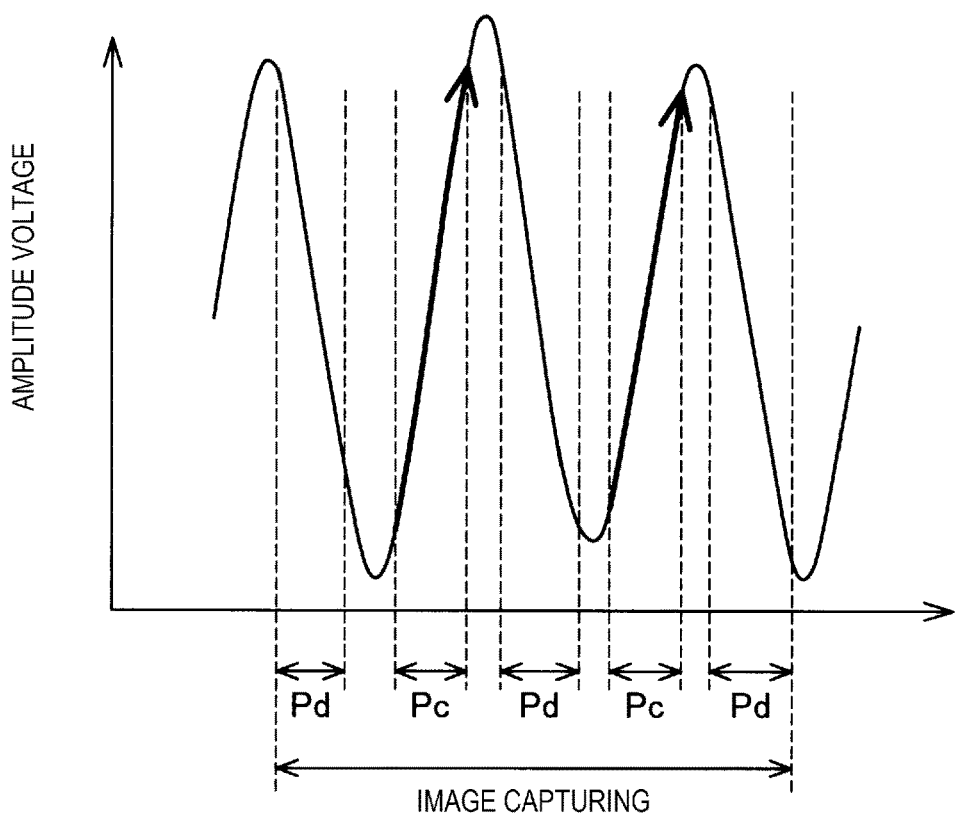
FIG. 15 is a timing chart showing that the mirror angle is controlled in accordance with the result of the detection performed by the environment detection sensor.
Figure 15:
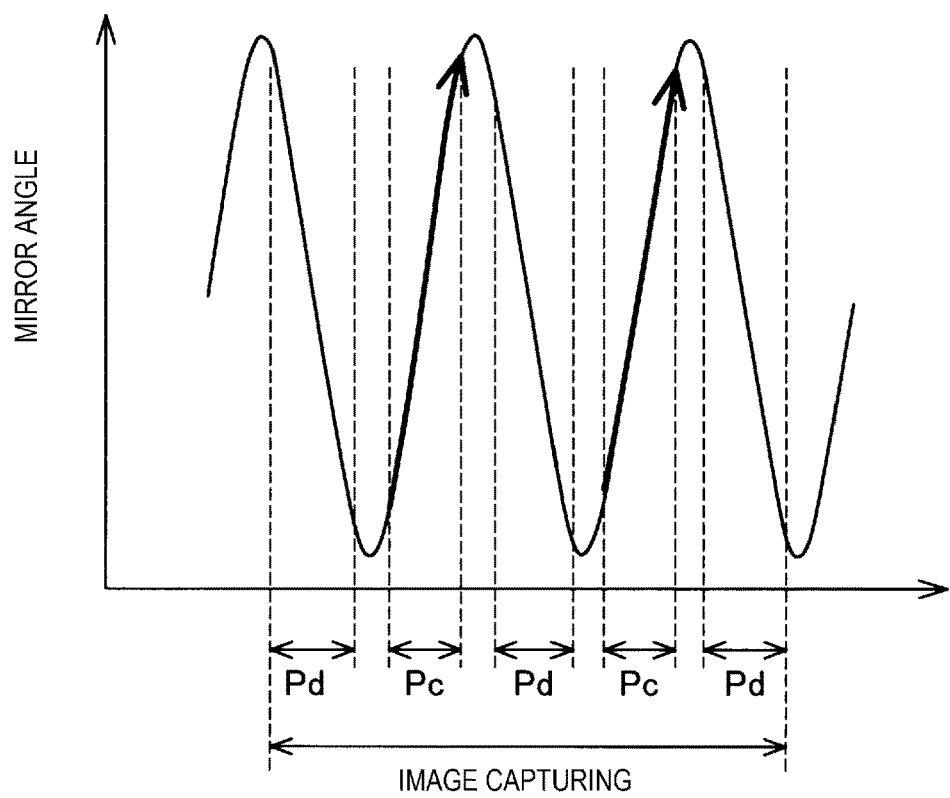

FIG. 15 is a timing chart showing that the mirror angle is controlled in accordance with the result of the detection performed by the environment detection sensor 52. The upper portion of FIG. 15 shows an example of a change in the amplitude voltage, and the lower portion of FIG. 15 shows an example of a change in the mirror angle. An image capture period for which the three-dimensional measurement apparatus 4 captures an image includes an image drawing period Pd and an amplitude changing period Pc. The image drawing period Pd is a period for which the linear patterned light PL is so swept that the target object W is irradiated with the patterned light PL. The amplitude changing period Pc is a period for which no image is drawn but the amplitude voltage supplied to the electromagnetic coil 456 can be changed. In the present embodiment, the amplitude voltage is changed in the amplitude changing period Pc in accordance with the result of the detection performed by the environment detection sensor 52, and the level of the voltage is changed based on the correction of the DC offset and the correction of the AC current. On the other hand, the mirror angle is maintained at substantially constant because the influence due to the environmental factors, such as the temperature, is compensated by the control of the amplitude voltage. As described above, in the present embodiment, the swing motion of the mirror 451 is controlled in accordance with the result of the detection performed by the environment detection sensor 52, whereby precise patterned light PL can be projected with the influence of the environmental factors associated with the mirror 451 compensated.

As described above, in the present embodiment, the environment detection sensor 52 is disposed in a position where the environment detection sensor 52 overlaps with or is adjacent to the substrate fixing section 457 but does not overlap with the MEMS substrate 46 in the plan view viewed in the direction perpendicular to the surface of the MEMS substrate 46. The configuration described above, in which the environment detection sensor 52 is disposed in the specific position described above, allows detection of the environmental factors associated with the mirror 451 without causing unstable swing motion of the mirror 451.

Figure 16:
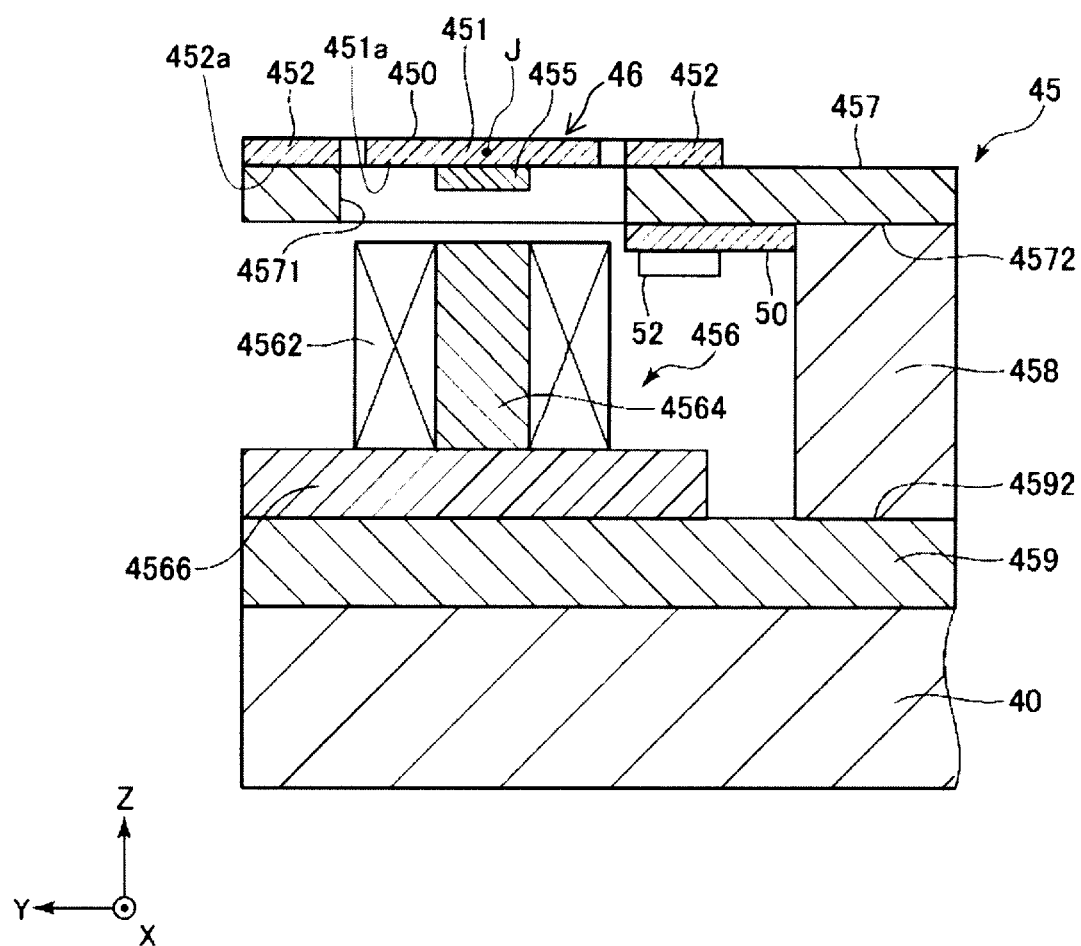
FIG. 16 is a cross-sectional view showing another example of the configuration of the optical scanning section provided with the environment detection sensor.

FIG. 16 is a cross-sectional view showing another example of the configuration of the optical scanning section 45 provided with the environment detection sensor 52. The permanent magnet 455 is disposed on the rear surface 451a, which is opposite a light reflection surface of the mirror 451, as described above. The light reflection surface is a surface that is parallel to the surface of the MEMS substrate 46 and reflects the laser light L. The substrate fixing section 457 has a first surface that is the surface on which the MEMS substrate 46 is disposed and a second surface that is a rear surface opposite the first surface. The optical scanning section 45 includes the electromagnetic coil 456, which is so disposed as to face the rear surface of the mirror 451 and causes the mirror 451 to swing. In the example shown in FIG. 16, the environment detection sensor 52 and the wiring substrate 50 are provided on the rear surface of the substrate fixing section 457. The configuration described above, in which the environment detection sensor 52 is provided on the side where the electromagnetic coil 456 is provided, advantageously allows the environment detection sensor 52 to precisely detect the influence of the heat generated by the electromagnetic coil 456.

The present disclosure is not limited to the embodiment described above and can be achieved in a variety of aspects to the extent that they do not depart from the substance of the present disclosure. For example, the present disclosure can be achieved by the aspects below. The technical features described in the above embodiment and corresponding to the technical features in the aspects described below can be replaced with other features or combined with each other as appropriate to solve part or entirety of the problems described in the present disclosure or achieve part or entirety of the effects provided by the present disclosure. When the technical features have not been described as essential features in the present specification, the technical features can be deleted as appropriate.

(1) According to a first aspect of the present disclosure, an optical scanning apparatus is provided. The optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

The optical scanning apparatus, in which the environment detection sensor is disposed in the specific position described above, can detect the environmental factor associated with the mirror without causing unstable swing motion of the mirror.

(2) In the optical scanning apparatus described above, the environment detection sensor may be disposed in a position where the environment detection sensor does not overlap with the MEMS substrate in a side view viewed in the direction parallel to the surface of the MEMS substrate and perpendicular to the swing axis.

The optical scanning apparatus, in which the environment detection sensor is disposed in the specific position described above, can detect the environmental factor associated with the mirror without causing unstable swing motion of the mirror.

(3) In the optical scanning apparatus described above, assuming a mirror range that represents the segment extending between opposite ends of the mirror along the swing axis but shifted in a direction perpendicular to the swing axis in the plan view, the environment detection sensor may be disposed in a position where the environment detection sensor overlaps with the mirror range.

According to the optical scanning apparatus described above, the environment detection sensor can be disposed in a position close to the mirror.

(4) In the optical scanning apparatus described above, the environment detection sensor may be disposed on a wiring substrate, and the wiring substrate may overlap with part of the substrate fixing section in the plan view.

According to the optical scanning apparatus described above, the environment detection sensor can be disposed in a position close to the mirror.

(5) In the optical scanning apparatus described above, the mirror may be provided with a permanent magnet disposed on a rear surface of the mirror that is the surface opposite a light reflection surface, the substrate fixing section may have a first surface on which the MEMS substrate is disposed and a second surface opposite the first surface, the optical scanning apparatus may further include an electromagnetic coil that is so disposed as to face the rear surface of the mirror and causes the mirror to swing, and the environment detection sensor may be provided on the second surface of the substate fixing section.

The optical scanning apparatus described above, in which the environment detection sensor is provided on the side where the electromagnetic coil is provided, allows the precise detection of the influence of the heat generated by the electromagnetic coil.

(6) In the optical scanning apparatus described above, the environment detection sensor may include at least one of a temperature sensor, an inertia sensor, a pressure sensor, and a magnetism sensor.

The optical scanning apparatus described above allows detection of a variety of environmental factors.

(7) According to a second aspect of the present disclosure, a three-dimensional measurement apparatus that three-dimensionally measures a target object by using laser light is provided. The three-dimensional measurement apparatus includes a projection section that includes a laser light source that outputs the laser light and an optical scanning apparatus that projects patterned light formed of the laser light on a region containing the target object, an imaging section that captures an image of the region containing the target object irradiated with the laser light to acquire image data, and a measurement section that three-dimensionally measures the region containing the target object based on the image data. The optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

The three-dimensional measurement apparatus, in which the environment detection sensor is disposed in the specific position described above, can detect the environmental factor associated with the mirror without causing unstable swing motion of the mirror.

(8) According to a third aspect of the present disclosure, a robot system is provided. The robot system includes a robot including a robot arm, a three-dimensional measurement apparatus that is installed on the robot arm and three-dimensionally measures a target object by using laser light, and a robot control apparatus that controls the operation of driving the robot based on the result of the measurement performed by the three-dimensional measurement apparatus. The three-dimensional measurement apparatus includes a projection section that includes a laser light source that outputs the laser light and an optical scanning apparatus that projects patterned light formed of the laser light on a region containing the target object, an imaging section that captures an image of the region containing the target object irradiated with the laser light to acquire image data, and a measurement section that three-dimensionally measures the region containing the target object based on the image data. The optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

The robot system, in which the environment detection sensor is disposed in the specific position described above, can detect the environmental factor associated with the mirror without causing unstable swing motion of the mirror.

What is claimed is:

1. An optical scanning apparatus that projects patterned light formed of laser light, the optical scanning apparatus comprising:
    a MEMS substrate including a mirror that swings around a swing axis;
    a substrate fixing section to which the MEMS substrate is fixed; and
    an environment detection sensor that detects an environment factor associated with the mirror,
    wherein the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

2. The optical scanning apparatus according to claim 1, wherein the environment detection sensor is disposed in a position where the environment detection sensor does not overlap with the MEMS substrate in a side view viewed in a direction parallel to the surface of the MEMS substrate and perpendicular to the swing axis.

3. The optical scanning apparatus according to claim 1, wherein assuming a mirror range that represents a segment extending between opposite ends of the mirror along the swing axis but shifted in a direction perpendicular to the swing axis in the plan view, the environment detection sensor is disposed in a position where the environment detection sensor overlaps with the mirror range.

4. The optical scanning apparatus according to claim 1, further comprising a wiring substrate including wiring for the environment detection sensor,
    part of the wiring substrate overlaps with the substrate fixing section in the plan view, and the environment detection sensor is disposed in a position where the environment detection sensor overlaps with the part in the plan view.

5. The optical scanning apparatus according to claim 1, wherein the mirror is provided with a permanent magnet disposed on a rear surface of the mirror that is a surface opposite a light reflection surface, the substrate fixing section has a first surface on which the MEMS substrate is disposed and a second surface opposite the first surface, the optical scanning apparatus further comprises an electromagnetic coil that is so disposed as to face the rear surface of the mirror and causes the mirror to swing, and the environment detection sensor is be provided on the second surface of the substate fixing section.

6. The optical scanning apparatus according to claim 1, wherein the environment detection sensor includes at least one of a temperature sensor, an inertia sensor, a pressure sensor, and a magnetism sensor.

7. A three-dimensional measurement apparatus that three-dimensionally measures a target object by using laser light, the three-dimensional measurement apparatus comprising:

a projection section that includes a laser light source that outputs the laser light and an optical scanning apparatus that projects patterned light formed of the laser light on a region containing the target object;

an imaging section that captures an image of the region containing the target object irradiated with the laser light to acquire image data; and a measurement section that three-dimensionally measures the region containing the target object based on the image data, wherein the optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

8. A robot system comprising a robot including a robot arm; a three-dimensional measurement apparatus that is installed on the robot arm and three-dimensionally measures a target object by using laser light; and a robot control apparatus that controls operation of driving the robot based on a result of the measurement performed by the three-dimensional measurement apparatus, wherein the three-dimensional measurement apparatus includes a projection section that includes a laser light source that outputs the laser light and an optical scanning apparatus that projects patterned light formed of the laser light on a region containing the target object, an imaging section that captures an image of the region containing the target object irradiated with the laser light to acquire image data, and a measurement section that three-dimensionally measures the region containing the target object based on the image data, the optical scanning apparatus includes a MEMS substrate including a mirror that swings around a swing axis, a substrate fixing section to which the MEMS substrate is fixed, and an environment detection sensor that detects an environment factor associated with the mirror, and the environment detection sensor is disposed in a position where the environment detection sensor overlaps with or is adjacent to the substrate fixing section but does not overlap with the MEMS substrate in a plan view viewed in a direction perpendicular to a surface of the MEMS substrate.

\* \* \* \* \*